United States Patent
Trundle et al.

(10) Patent No.: US 12,374,162 B2
(45) Date of Patent: *Jul. 29, 2025

(54) SPOOFING ATTACK DETECTION

(71) Applicant: Alarm.com Incorporated, Tysons, VA (US)

(72) Inventors: Stephen Scott Trundle, Falls Church, VA (US); Daniel Todd Kerzner, McLean, VA (US); Allison Beach, Leesburg, VA (US); Babak Rezvani, St Petersburg, FL (US); Donald Gerard Madden, Columbia, MD (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,234

(22) Filed: Apr. 9, 2024

(65) Prior Publication Data

US 2024/0273950 A1 Aug. 15, 2024

Related U.S. Application Data

(63) Continuation of application No. 17/383,942, filed on Jul. 23, 2021, now Pat. No. 11,983,963.

(Continued)

(51) Int. Cl.
*G06V 40/40* (2022.01)
*G06V 10/40* (2022.01)
(Continued)

(52) U.S. Cl.
CPC ............. *G06V 40/40* (2022.01); *G06V 10/40* (2022.01); *G06V 10/751* (2022.01); *G06V 40/10* (2022.01)

(58) Field of Classification Search
CPC ........ G06V 40/10; G06V 40/40; G06V 10/40; G06V 10/751; G06F 18/22; G07C 9/00182

See application file for complete search history.

(56) References Cited

U.S. PATENT DOCUMENTS 9,396,599 B1 7/2016 Malhotra
10,360,599 B2 7/2019 Costello
(Continued)

FOREIGN PATENT DOCUMENTS

CN 114430484 5/2022
CN 114430484 A * 5/2022
(Continued)

OTHER PUBLICATIONS

[No Author Listed] [online], "Both Keys at the Same Time?" Apr. 27, 2015, retrieved on Mar. 4, 2024, <https://www.youtube.com/watch?v=pnBVIhiUd_g>, 4 pages [Video Submission].

(Continued)

*Primary Examiner* — Shaghayegh Azima
(74) *Attorney, Agent, or Firm* — Fish & Richardson P.C.

(57) ABSTRACT

Methods, systems, and apparatus, including computer programs encoded on computer-storage media, for visual authentication. In some implementations, a method may include obtaining images of a person at a property; detecting a discontinuity in an appearance of the person in the images of the person at the property; determining that the discontinuity does not correspond to a known occlusion; and providing an indication of a potential spoofing attack.

20 Claims, 8 Drawing Sheets

Related U.S. Application Data

(60) Provisional application No. 63/056,072, filed on Jul. 24, 2020.

(51) Int. Cl.
*G06V 10/75* (2022.01)
*G06V 40/10* (2022.01)

(56) References Cited

U.S. PATENT DOCUMENTS

| | | | |
|---|---|---|---|
| 10,375,573 | B2 | 8/2019 | Bergdale et al. |
| 10,402,631 | B2 | 9/2019 | Wang et al. |
| 10,579,783 | B1* | 3/2020 | Aument ............... G06V 40/40 |
| 10,643,441 | B1* | 5/2020 | Sanchez ............ G08B 21/0283 |
| 11,200,767 | B2* | 12/2021 | Boyes ....................... G07C 9/37 |
| 11,200,793 | B2* | 12/2021 | Hutz ...................... G06V 40/20 |
| 11,227,171 | B2* | 1/2022 | Halet ..................... G06V 40/16 |
| 11,412,157 | B1 | 8/2022 | Slavin |
| 11,676,433 | B2 | 6/2023 | Nam |
| 12,126,613 | B2* | 10/2024 | Lindemann ............. H04L 63/20 |
| 2005/0249382 | A1 | 11/2005 | Schwab et al. |
| 2006/0170769 | A1* | 8/2006 | Zhou ....................... G06V 20/52 |
| | | | 382/103 |
| 2009/0167857 | A1 | 7/2009 | Matsuda et al. |
| 2009/0245571 | A1* | 10/2009 | Chien .................... G06V 10/28 |
| | | | 382/103 |
| 2011/0169917 | A1 | 7/2011 | Stephen et al. |
| 2013/0201286 | A1 | 8/2013 | Schockmel et al. |
| 2015/0221151 | A1 | 8/2015 | Bacco et al. |
| 2017/0161562 | A1 | 6/2017 | Astrom et al. |
| 2017/0221289 | A1 | 8/2017 | Trani |
| 2017/0294088 | A1 | 10/2017 | Patterson et al. |
| 2017/0294089 | A1* | 10/2017 | Miwa ................... G08B 25/005 |
| 2018/0012094 | A1* | 1/2018 | Wu .......................... G06T 7/90 |
| 2018/0060672 | A1 | 3/2018 | Takeda |
| 2018/0157259 | A1* | 6/2018 | Myslinski ............ G05D 1/0094 |
| 2018/0167501 | A1 | 6/2018 | Peterson et al. |
| 2019/0141294 | A1 | 5/2019 | Thorn et al. |
| 2019/0325682 | A1* | 10/2019 | Petkov ..................... G06T 7/521 |
| 2020/0234523 | A1 | 7/2020 | Ma et al. |
| 2021/0020022 | A1* | 1/2021 | Hutz ...................... G06V 20/40 |
| 2021/0335071 | A1 | 10/2021 | Nam |
| 2021/0374426 | A1 | 12/2021 | Park et al. |
| 2021/0407266 | A1* | 12/2021 | Jarvis ....................... G06N 3/02 |
| 2022/0374628 | A1* | 11/2022 | Hassani .................. B60R 25/01 |
| 2022/0374641 | A1* | 11/2022 | Hassani ............... G05D 1/0055 |
| 2023/0008297 | A1* | 1/2023 | Lyu ...................... G06V 40/161 |
| 2023/0260345 | A1 | 8/2023 | Nam |
| 2024/0320374 | A1 | 9/2024 | Zhu et al. |

FOREIGN PATENT DOCUMENTS

| | | |
|---|---|---|
| DE | 102018119767 | 2/2020 |
| JP | 2006-215858 | 8/2006 |
| KR | 20210147679 | 12/2021 |

OTHER PUBLICATIONS

Extended European Search Report in European Appln. No. 21791864.8, dated Jul. 4, 2023, 10 pages.

International Search Report and Written Opinion in International Appln. No. PCT/US2021/028856, mailed Jul. 20, 2021, 10 pages.

\* cited by examiner

SPOOFING ATTACK DETECTION

CROSS-REFERENCE TO RELATED APPLICATIONS

This application is a continuation of U.S. application Ser. No. 17/383,942, filed Jul. 23, 2021, which claims the benefit of U.S. Provisional Application No. 63/056,072, filed on Jul. 24, 2020. The disclosure of each of the foregoing applications is incorporated herein by reference.

BACKGROUND

A monitoring system for a property can include various components including sensors, cameras, and other devices. For example, the monitoring system may use the camera to capture images of people that enter the property.

SUMMARY

This specification describes techniques, methods, systems, and other mechanisms for visually authenticating a person. Authenticating a person may be useful. For example, a property may use an automated entry system where a control unit determines whether or not to authenticate a person approaching the property.

Authenticating a user may be done with one or more cameras capturing one or more images. For example, a front door camera can be used to capture one or more images of a person as the person approaches the front door. The front door camera can send the one or more images to a control unit.

The control unit may have the functionality to obtain one or more images captured at a property and process the one or more images to determine one or more discontinuities. For example, the control unit can detect a person using a form of visual recognition. The control unit can detect a corresponding facial feature for the detected person. The facial feature can be one or more values arranged as one or more feature vectors that represent the visual information of a face corresponding to the detected person.

Based on obtaining one or more images captured at a property, the control unit can determine whether or not a spoofing attack is taking place. A spoofing attack can be a security attack on a property. In some cases, the spoofing attack can involve a person disguising themselves as a different person to gain entrance into a property. For example, a person may attempt to spoof a system by wearing a mask or holding up a picture of a different person over their face. In some cases, the goal of the person may be to have the visual authentication system authenticate aspects of the disguise instead of aspects of the person.

The control unit may alert a user, owner, or the like, responsive to detecting a potential spoofing attack or discontinuity event. For example, if a facial feature representing a detected object changes from one image to a subsequent image, the control unit can register this as a discontinuity event. Depending on predetermined settings, the control unit can initiate protocols to be run within a property or wait for feedback from a user, owner, central station, or similar entity regarding appropriate actions to take regarding the discontinuity event. In some cases, a discontinuity event can be labeled as a potential spoofing event if confirmed by the control unit or by feedback from an entity communicably connected to the control unit.

The control unit may determine, based on stored information that a given discontinuity is not a spoofing attack. For example, a person may walk in front of a pillar. A series of images captured may result in a discontinuity event as a person is visible in one image, behind the pillar in another, and then visible in a third image. In the example of a pillar, the control unit can query an occlusion database of known occlusion regions. If the occlusion is because of the pillar, the region in which the occlusion took place will match the region stored in the occlusion database. In this way, the control unit can determine, based on stored data, a given discontinuity is not a likely spoofing attack.

In some implementations, images captured before a user is detected within an image are used to detect changes in the background of captured images. For example, a bad actor may hack a system and display recorded video or an image to effectively blind a system from detecting elements in view. By capturing images and associating one or more feature vectors generating by visual recognition algorithms, a system can track the appearance of a background. If the appearance of a background changes, the system can detect this change as a discontinuity event and alert one or more entities, change security settings, or trigger additional automated responses (e.g., lock doors, or the like) accordingly.

In some implementations, discontinuities are detected by comparing a first set of one or more feature vectors representing a first visual element and a second set of one or more feature vectors representing a second visual element to generate one or more difference values. If the one or more difference values are above a threshold, a discontinuity event may be triggered and corresponding actions may be taken. A visual element can include a face, a body, a background, a car, a tree, or any other detected element within an image. Corresponding actions taken after triggering the discontinuity event can depend on system settings as discussed in the following examples.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
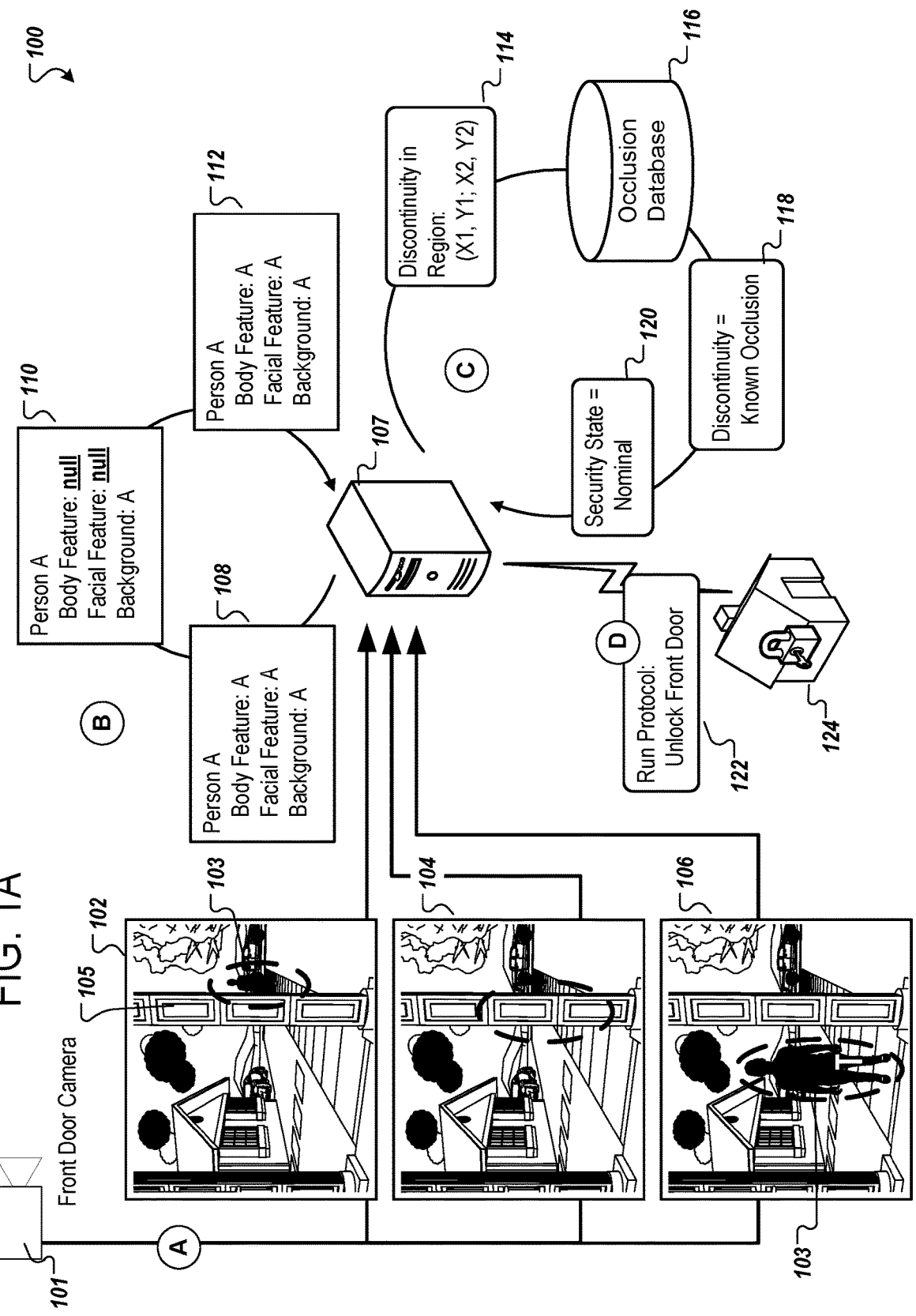
FIG. 1A is a diagram showing an example of a system for visual authentication authenticating a user.

FIG. 1A is a diagram showing an example of a system 100 for visual authentication authenticating a user 103. The system 100 includes a front door camera 101 communicably connected to a control unit 107. The control unit 107 is communicably connected to an occlusion database 116 and a property 124. In the example of FIG. 1A, the property 124 communicably connected to the control unit 107 includes an automatic door unlocking device configured to run a protocol for unlocking or locking a door of the property 124.

In stage A of FIG. 1A, the front door camera 101 sends images to the control unit 107. The images include a first image 102, a second image 104, and a third image 106. The user 103 is shown within the first image 102 and the third image 106 but is blocked from view in the second image 104 by a pillar 105 of the property 124. Some additional features that are shown within the first image 102, the second image 104, and the third image 106 are labeled in FIG. 4, FIG. 5, and FIG. 6, and described in corresponding sections of this specification.

The front door camera 101 captures the first image 102 as the user 103 approaches a front door of the property 124. The front door of the property 124 is equipped with the front door camera 101. The first image 102 captures both the user 103 and the pillar 105.

The front door camera 101 captures the second image 104 as the user 103 walks behind the pillar 105 from the viewpoint of the front door camera 101. In some implementations, one or more additional cameras are used to capture one or more additional images of the user 103. The one or more additional images of the user can be used to determine the location and features of the user 103. The additional images can be used to check for any discontinuity in images captured at the property 124.

The front door camera 101 captures the third image 106 as the user 103 walks from behind the pillar 105 toward the front door of the property 124. The front door camera 101 sends data representing the first image 102, the second image 104, and the third image 106 to the control unit 107. In some implementations, the front door camera 101 captures the first image 102 and sends the first image 102 to the control unit 107. The front door camera 101 can then capture the second image 104 and send the second image 104 to the control unit 107. In this way, the front door camera 101 can send one or more images to the control unit 107 in the order the images were captured.

In stage B of FIG. 1A, the control unit 107 processes the first image 102, the second image 104, and the third image 106. The control unit 107 receives the images and determines, based on the received images, objects within the images. Various processing methods including those involving machine learning, artificial intelligence, algorithms and the like, can be used. The method used for object detection and recognition is not limited in this specification. Features detected in the first image 102 are shown in item 108. Features detected in the second image 104 are shown in item 110. Features detected in the third image 106 are shown in item 112.

The control unit 107 determines, based on the first image 102, an object corresponding to the user 103. The control unit 107 labels the object "Person A" as shown in the item 108. The control unit 107 also determines additional features related to Person A including a body feature and a facial feature. The control unit 107 also determines a background corresponding to the first image 102. For simplicity, the letter A is meant to represent one or more data values corresponding to one or more feature vectors describing a given condition of visual elements within the images.

A body feature representing data abstracted from visual elements of visual portions of the body of the user 103 captured in the first image 102 is referred to as "Body Feature A". Similarly, a facial feature representing data abstracted from visual elements of visual portions of the face of the user 103 captured in the first image 102 is referred to as "Facial Feature A". The background, including weather, amount and type of light, property features such as cars in driveway and the like, can be captured in a corresponding data feature. The background corresponding to the first image 102 is referred to here as "Background A".

In processing the second image 104, the control unit 107 does not detect any visual portions of the user 103 corresponding to the stored event of Person A. Corresponding data can be stored corresponding to the second image 104. In the example of FIG. 1A, the control unit 107 sets body feature to "null" and facial feature to "null" for the Person A as the Person A is not detected within the second image. This is because the user 103 is behind the pillar 105. In other implementations, other possible obstructions or visual malfunctions may be the cause of an object not being shown in an image. The control unit 107 can log any difference between detections associated with one or more images as discontinuities. In this case, the Person A event, corresponding to the Body Feature A and the Facial Feature A is not found in the second image 104. A discontinuity event corresponding to this change can be saved for the control unit 107 to process.

The control unit 107 processes the third image 106 and, similar to the processing of the first image 102, detects an object corresponding to the user 103. Data representing a body feature of the detected object matches the stored value of the Body Feature A determined in reference to the first image 102. Similarly, data representing a facial feature of the detected object matches the stored value of the Facial Feature A also determined in reference to the first image 102. The object can be labeled as an additional sighting of the Person A.

In some implementations, the control unit 107 recognizes features (e.g., face, torso, clothing, legs, shoes, hair color, among others) within a portion of an image without identifying a user. For example, the control unit 107 can process the first image 102 that includes a sighting of the user 103 and detect human features of the user 103 without identifying the user 103. The features may not be sufficient to identify the user 103 but may be sufficient to match the sighting of the user 103 in the first image 102 to the sighting of the user 103 in the third image 106.

In some implementations, the control unit 107 uses system variables or detected features to match an instance in one or more images to another instance in another set of one or more images. For example, the control unit 107 can record a first timestamp associated with the first image 102 and a third timestamp associated with the third image 106 (e.g., the control unit 107 receives a first timestamp corresponding to when the front door camera 101 captures the first image 102 and a third timestamp corresponding to when the front door camera 101 captures the third image 106). The control unit 107 can determine that features detected in the first image 102 correspond to a sighting of the user 103 based on the identification of the user 103 within the third image 106 and the first timestamp and the third timestamp.

In some implementations, other features such as one or more clothing colors among others are used to match two or more incidents and to identify a first set of detected features in a first set of one or more images based on identifying a second set of detected features in a second set of one or more images. For example, the control unit 107 can detect a person wearing a white shirt in the first image 102. The control unit 107 can identify the person as the user 103 in the third image 106 and detect that the user 103 is wearing a white shirt. The control unit 107 can match the incident of the detected white shirt in the first image 102 to the detected white shirt in the third image 106. Based on such matching, the control unit 107 can copy the identification of the user 103 from the third image 106 to the first image 102 such that the user 103 is identified in both the first image 102 and the third image 106.

In some implementations, matching a feature between a set of one or more images and another set of one or more images can be combined with at least one other method that associates the set of one or more images and another set of one or more images. For example, the control unit 107 can match an incident of a detected white shirt in the first image 102 to a detected white shirt in the third image 106 worn by the identified user 103. The control unit 107 can also record a first timestamp associated with the first image 102 and a third timestamp associated with the third image 106. Based on matching the two detections of a white shirt, a relationships between the first timestamp and the third timestamp, and the identification of the user 103 in the third image 106, a person associated with the detection of the white shirt in the first image 102 can be identified as the user 103. The comparison of the timestamps can be used to prevent unrelated incidents (e.g., a person wearing a white shirt visiting in the morning and a person wearing a similar white shirt visiting in the afternoon, among others) being matched and used to copy identifications. In general, any detected feature or system variable from two or more sets of one or more images can be used, either individually or in combination, to associate one or more identifications of one or more objects present within the two or more sets of one or more images.

In stage C of FIG. 1A, the control unit 107 processes the discontinuity event related to the items 108 and 110. The Body Feature A corresponding to the Person A in item 108 transitions to a null value in item 110. Similarly, the Facial Feature A corresponding to the Person A in item 108 transitions to a null value in item 110. The transitions in value of the two features related to the Person A, result in a discontinuity event registered by the control unit 107.

In some implementations, other detections are used to generate a discontinuity event. For example, one feature transition from a first value to a second value can be sufficient to trigger a discontinuity where a difference value between the first value and the second value is above a predetermined threshold. In another example, the Body Feature A can transition from the value A to a different value B. This could signify that aspects related to the body of the Person A have changed. In some cases, this can mean that a person has changed clothes or put on a form of costume or disguise.

The control unit 107 detects the discontinuity in a certain region of the second image 104. The image is described in this example using 4 values representing two sets of x and y coordinates. The x and y coordinates can be used to describe a rectangular shape containing where the discontinuity occurred. In other implementations, other region labeling techniques can be used. For example, an x and y coordinate and a value representing a radius for a circle can be used to define a region related to a discontinuity. In general, any suitable region labeling can be used for comparing current data to stored data.

Data related to the discontinuity event, including location and elements determined by visual recognition can be used by the control unit 107 to determine the validity of the discontinuity and whether or not alerts or other actions need to be taken. In the example of FIG. 1A the control unit 107 queries the occlusion database 116 based on the data of the discontinuity event. In this case, the location of the discontinuity event (X1, Y1; X2, Y2) is a known location associated with known occlusions. The system 100 has stored similar discontinuity events and, either through system processing or manual feedback from a user, has determined that the discontinuity of the Person A not being recognized in the second image 104 is a known occlusion. In this case, the known occlusion is caused by the pillar 105.

In some implementations, the occlusion database 116 includes one or more entries detailing known occlusions. For example, the control unit 107 can determine, based on gathering data from one or more sensors or devices at the property 124 or receiving feedback from another entity such as a central station or owner, that a given occlusion is valid. A valid occlusion could be a static object that occludes a person within a given view such as the pillar 105 of FIG. 1A. The control unit 107 can store one or more details related to the valid occlusion and store it within the occlusion database 116 as a valid occlusion. When a similar discontinuity results from an occlusion, the control unit 107 can find the valid occlusion stored in the occlusion database and determine that the similar discontinuity is also valid.

In some implementations, the occlusion database 116 can be a stored entity allowing access from one or more control units controlling one or more properties. The occlusion database 116 can be communicably connected to a central station. The central station can be used to query the occlusion database 116. The central station can receive valid occlusions from one or more control units and store related data values on the occlusion database 116. Data entries stored on the occlusion database 116 can be associated with certain regions, properties, users or other values depending on implementation.

Based on querying the occlusion database 116, the control unit 107 can determine that the discontinuity event is a known occlusion. As a result, the control unit 107 can set a security state variable. The security state variable can represent a current security state of the system 100. For example, if a potential threat was detected near the property 124, the security state could change to an escalated state. An escalated state can be associated with additional security measures among other things. In some cases, transitions from one security state to another can result in specific actions taking place.

In some implementations, the control unit 107 does not query the occlusion database 116. For example, the control unit 107 can observe the user 103 in the third image 106. The control unit 107 can compare a timestamp associated with the second image 104 and a timestamp associated with the third image and determine the third image 106 represents a time after the second image 104. The control unit 107 can compare the facial and body features detected in the third image 106 and the first image 102 and determine, based on a degree of similarity between one or more values representing the facial and body features of the first image 102 and the third image 106, that the user has not changed appearance. Based on determining that the user has not changed appearance, the control unit 107 can decrease a given likelihood that the given discontinuity event is a spoofing attack.

After setting the security state to nominal, as shown in item 120, the control unit 107 can continue a normal authentication process of the user 103. Although the user 103 was not continuously tracked to an entry point of the property 124, the discontinuity was determined by the control unit 107 to not be suspicious as the discontinuity corresponded to a known discontinuity location. In response, normal operations can continue. The user 103, corresponding to portions of the third image 106 near the front door of the property 124, can then be authenticated. Authentication can, depending on implementation, involve any conventional visual, voice, PIN, card swipe, or other forms of authentication.

The control unit 107, in response, sends a signal 122 to the property 124 to run a protocol. In this case, the protocol includes unlocking the front door. An automatic door opening device can be used to perform the actions detailed in the sent protocol. In other implementations, other actions or different actions can be performed. For example, entryway automatic lighting can be switched on responsive to a successful authentication of the user 103. In general, any task controlled in the system 100 corresponding to the property 124 can be performed.

Figure 1B:
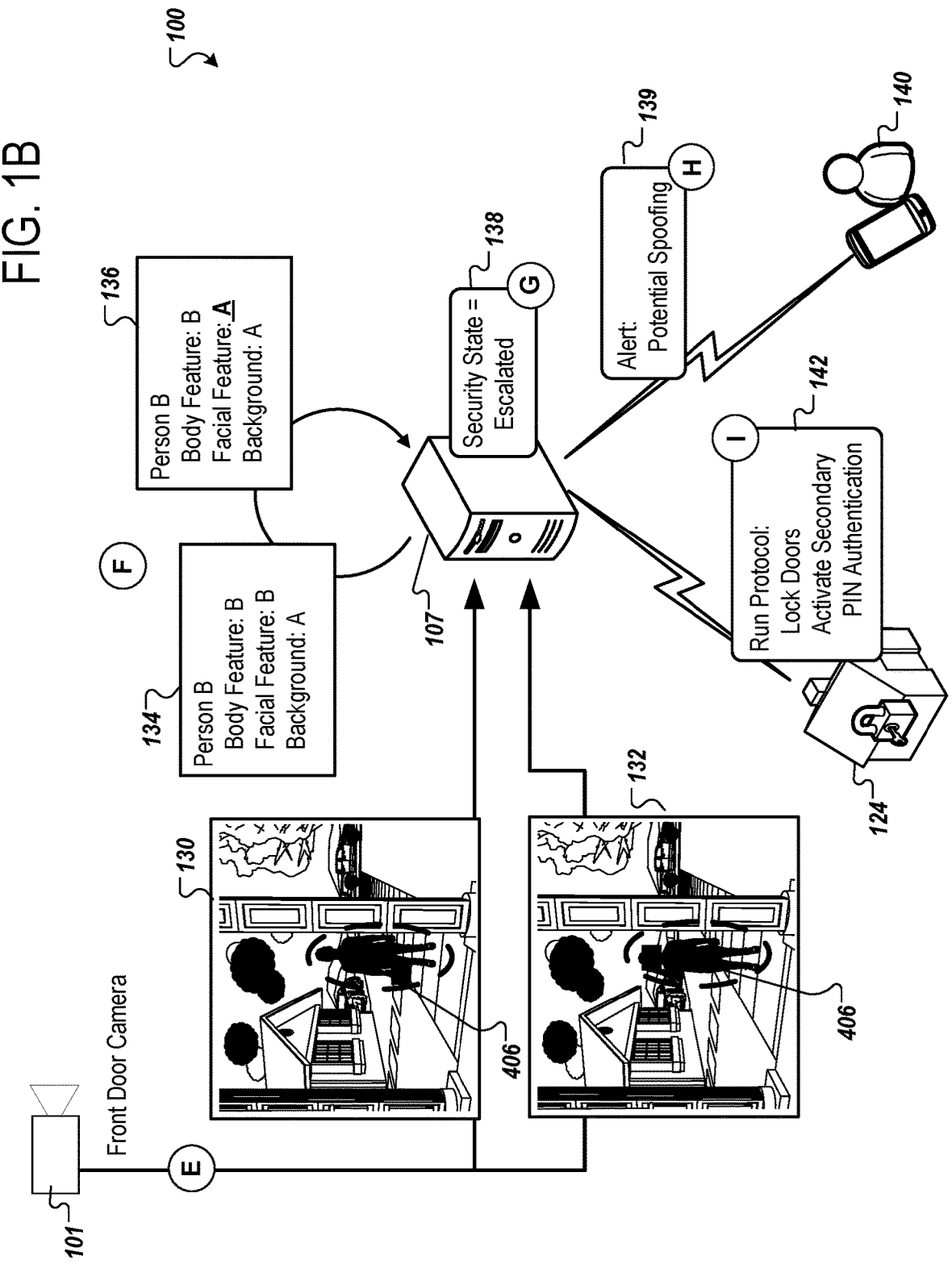
FIG. 1B is a diagram showing an example of a system for visual authentication alerting a user to a spoofing attack.

FIG. 1B is a diagram showing another example of the system 100 for visual authentication. In FIG. 1B, the system 100 is shown alerting a user 140 to a potential spoofing attack. An unauthorized user 406 approaches the front door of the property 124.

In stage E, shown in FIG. 1B, the front door camera 101 captures a fourth image 130 and a fifth image 132 of the unauthorized user 406 as they approach the front door of the property 124.

The front door camera 101 sends the fourth image 130 and the fifth image 132 to the control unit 107 for processing similar to the process shown in FIG. 1B. The front door camera 101 can send the images one at a time or in groups of two or more images.

In stage F, the control unit 107 receives the fourth image 130 and the fifth image 132 from the front door camera 101. The control unit 107 uses one or more predetermined visual recognition algorithms to determine visual features in the fourth image 130, as shown in item 134. The control unit 107 uses similar predetermined visual recognition to determine visual features in the fifth image 132, as shown in item 136.

Item 134 recites features determined by the control unit 107 and related visual recognition processes. In the example of FIG. 1B, the control unit 107 determines based on the fourth image 130, a "Person B" approaching the front door of the property 124. The Person B has a corresponding body feature and facial feature specific to the visual recognition of the unauthorized user 406 as they approach. For simplicity, the body feature of Person B will be referred to as "Body Feature B" and the facial feature will be referred to as "Facial Feature B". The background of the image is unchanged from the previous example. The background corresponds to Background A where Background A represents one or more values stored in one or more feature vectors that describe visual elements shown in the fourth image 130.

In some implementations, data representing a facial feature, body feature, or background includes one or more numeric values. For example, a matrix of vectors describing values associated with certain characteristics can be used to uniquely characterize a particular person. In the example of FIG. 1B, Body Feature B, can be a matrix of values associated with the visual recognition of the body of the unauthorized user 406 as they approach the property 124.

Item 136 similarly recites features determined by the control unit 107 and related visual recognition processes. In the example of FIG. 1B, the control unit 107 determines based on the fifth image 132, an object matching the Body Feature B. The object recognized by the control unit 107 does not, however, share the Facial Feature B of a prior determination shown in item 134. The facial feature associated with the determination of item 136 is Facial Feature A. The control unit 107 determines, based on the visible portions of the unauthorized user 406 in the fifth image 132, the facial feature corresponds to data values represented by Facial Feature A and not Facial Feature B. Responsive to detecting the change in facial feature data, the control unit 107 generates a discontinuity event.

As shown previously, Facial Feature A was the facial feature determined for the user 103. The user 103 was subsequently authenticated and allowed entry into the property 124. The control unit 107 determines based on the change from Facial Feature B to Facial Feature A from one captured image to a subsequent captured image, and based on stored data that informs the control unit 107 that data corresponding to the Facial Feature A is associated with successful authentication as shown in FIG. 1A, that the discontinuity event shown in the example of FIG. 1B is sufficient to trigger an alert warning. Additional features detected by the control unit 107 are shown in reference to FIG. 6. These additional features are similarly used to justify triggering the alert warning and can be included in any data sent to a party related to the alert warning.

In the example of FIG. 1B, the control unit 107 immediately flags the change of facial feature determined values as a discontinuity. In this case, the extracted feature vectors of the face shown in the fifth image 132 match the values of a previously authorized user, the user 103 shown in the example of FIG. 1A. In some cases, a change by a predetermined amount from one set of feature vectors describing a given feature to another set of feature vectors describing the same feature, can be sufficient to trigger a discontinuity by the control unit 107. In some cases, a smaller change from one or more related features can be sufficient to trigger a discontinuity.

In stage G, the control unit 107 escalates security by changing a system parameter. In the example of FIG. 1B the parameter is security state and the new value is escalated. As shown in FIG. 1A, another possible value of this variable is nominal. In other implementations, one or more other variables can be used to control the security state of a system. For example, "unknown persons on property", "time of day", or other similar values may be used collectively to determine, based on the values of each, necessary security changes to the system, such as the system 100. In some implementations, other states can be used. For example, partially escalated, lockdown, or other similar monikers associated with relevant state changes may be used.

In stage H, an alert 139 is sent from the control unit 107 to a device of a user 140. Some alert settings can be predetermined by either the control unit 107, the user 140 or another entity related to the system 100. For example, recipients for specific alerts may be set. In the example of FIG. 1B, discontinuities, which are determined to be invalid and therefore possibly suspicious are sent to the device of the user 140. In general, any related user, such as an owner or family member of an owner, can be notified with an alert such as the alert 139.

The alert 139 sent from the control unit 107 to the device of the user 140 includes data related to the discontinuity event determined in stage F. In this example, the user 140 receives the fourth image 130 and the fifth image 132 along with determinations generated by the control unit 107. The user 140 interacts with the received data to validate or invalidate the determinations generated.

In stage I, the control unit 107 sends a signal 142 to the property 124 to run a protocol. In this example, the protocol includes locking doors and activating a secondary PIN authentication. In other implementations, actions performed in a protocol may include more or fewer actions or actions related to different elements of the property 124.

In some implementations, the property 124 is instructed to lock doors that are not already locked. For example, the property 124 can determine, based on sensor data of one or more locks on the property 124, one or more locks that are unlocked. The property 124 can then send a signal to the one or more locks that are unlocked. The signal can include instructions for the one or more locks that are unlocked to commence a locking procedure.

In some implementations, the control unit 107 can share data with a central station. For example, a central station connected to one or more control units like the control unit 107 can receive data from the control unit 107 and perform further determination or alert further human oversight to determine relevant actions. The control unit 107 can send data corresponding to a discontinuity event or other features on the property 124 to the central station. The central station can send subsequent requests for additional data. The control unit 107 can provide additional data based on the requests for additional data.

In some implementations, another connected device is alerted based on the events on the property 124. For example, the control unit 107 can send a signal to a drone. The drone can proceed to a location of the property 124 and capture one or more images. The one or more images can be sent to the control unit 107 or other entity related to the system 100. For example, the drone could send pictures to public or private agencies e.g., the police or related organization. The control unit 107 can detail instructions for the drone. The instructions can be determined solely by the control unit 107 based one on or more determinations. The instructions can also be determined with input from one or more users responsive to a notification issued by the control unit 107 request additional input.

In some implementation, additional sensor data can be used to make a determination of a spoofing attack of a discontinuity event. For example, a thermal camera can be used to capture a thermal image on a property. In the example of a discontinuity involving the face of a person approaching the property 124, the thermal camera could be used to capture thermal data of the head of the person. In one example, the control unit 107 can determine, low temperature readings in the region corresponding to a face region of the person, that the person is wearing a mask or using another item to cover a true identity from the camera. The additional data can be used to change a security level from nominal to escalated, alert one or more entities, or generate and send signals to one or more connected systems. A thermal camera can be used in other instances to capture temperature data. For example, body temperature data can be used by the control unit 107 to determine a valid user to be authenticated.

In some implementations, additional data captured by the control unit 107 can be used to decrease the security level of a system. For example, if audio recordings from a microphone on-site detect the speech from the unauthorized user 406 as a particular authorized user, the control unit 107 can reduce a security level or reduce a value related to a likelihood of a spoofing attack. Of course, if other factors, such as facial feature discontinuity and thermal camera, or other sensor readings, are used by the control unit 107 to determine a relatively high likelihood of a spoofing attack, the control unit 107 can escalate the issue and send corresponding data to a user or central station for confirmation before taking further action. In some cases, the control unit 107 can lock down the property 124 if an event is not known to be spoofing or authentic. The property can be open through an additional security layer, such as a secondary authentication PIN number, or confirmation from an entity communicably connected to the control unit 107 that received a notification from the control unit 107.

In some implementations, a user must be continuously tracked during their approach in order to gain entrance to the property 124. For example, any unknown discontinuity or the like will result in additional security layers being added before entrance is granted or alerts to one or more entities such as a smartphone of a user.

In some implementations, other additional security layers are used. For example, instead of a secondary PIN, or in addition to a secondary PIN, a keycard swipe, iris scan, answer to question, or other forms of authentication can be used. The additional layer of security can be used anytime the control unit 107 determines a discontinuity event, a likely spoofing attack, or receives instructions from a managing entity of the system 100, such as the user 140, to increase security measure at the property 124.

In some cases, the user 140 responds to the alert 139. The response to the alert 139 may include data related to subsequent actions to be performed by the control unit 107 or other connected systems at the property 124. For example, the user 140 may instruct the control unit 107 that the person is in fact a friend or other known entity and should be allowed into the property 124. The user 140 may alternatively wish to have authorities called in and the user 140 may respond with instructions for the control unit 107 to alert authorities. The control unit 107 can store and send relevant data to authorities or any other party based on a request or settings of the system 100.

In some cases, the control unit 107 can send both the alert 139 and the signal 142 without receiving feedback from the user 140. The control unit 107 can implement a cautious strategy or any other nominal strategy based on predetermined settings until further instructions are received from a user such as the user 140. For example, the control unit 107 may be cautious and completely lock down the property 124 following a suspicious discontinuity event until receiving a response from the user 140. In some cases, a timeout related to the alert 139 sent to the user 140 can be used after which the control unit 107 can perform one or more actions. In some cases, the one or more actions may include alerting relevant authorities (e.g., police, fire department, or similar public or private agency).

In some implementations, the similarity of one feature determined at a first time from a first image compared to another feature determined at a second time from a second image is sufficient to link to determinations under the same event. For example, in the example of FIG. 1B, the determination in item 136 includes Body Feature B. This is sufficient to include the determination as an event of the Person B.

In some implementations, the event is given a new name and events with different labels can be compared based on visual properties of the two or more events. For example, a first event labeled "Event1234" and a later event, "Event9999" can each have data associated with them. In some cases, the data may be related to one or more features determined by a control unit such as the control unit 107. By comparing features of the two events, a relationship between the Event1234 and the Event9999 can be generated by the control unit 107.

In some cases, the control unit 107 can then apply a label to the group of two or more related events. The control unit 107 can send the event to a user or use previously stored events to determine a corresponding label based on the label given by the user or the label associated with the one or more previously stored events. For example, a previously stored event may be labeled Person B and include one or more similar features to the Event1234 and Event9999. The control unit can then label the related events Event1234 and Event9999 under a group label of Person B to build further recognition of Person B. Similarly, a user can send data to the control unit 107 to inform the control unit 107 of a correct label for the related events Event1234 and Event9999.

In some implementations, the control unit 107 sends data to a user of the system 100 to validate or invalidate a given discontinuity. For example, images related to the user 103 walking behind the pillar 105 can be sent to the user's smartphone. The user can interact with the data and send corresponding response data back to the control unit 107. The response data can include a decision as to whether the discontinuity was valid or invalid. Valid here can mean that the discontinuity is not the result of suspicious or potentially illegal activity. Whereas invalid can mean that the discontinuity is of suspicious nature. If the response is valid, the control unit 107 can perform a first protocol that can include authenticating the user using facial recognition or immediately unlocking a door or performing other automated tasks. If the response is invalid, the control unit 107 can perform a second protocol that can include locking doors, notifying other users, notifying authorities, calling support drones for additional visual data, or other similar actions. An actual protocol can include any action able to be performed by the control unit 107. In some cases, the user can assign specific actions for protocols to be performed to specific profiles. The user can apply any specific profile based on environment variable, system variable, or manual decision.

In some implementations, the control unit 107 can use additional visual recognition to determine certain aspects in the image and use the additional visual recognition to inform decisions. For example, the system 100 can be set so that if the control unit 107 detects a discontinuity that is potentially suspicious, and the control unit 107 also detects a user's car in the driveway, the control unit 107 can send an alert to a smart speaker inside the house that there is suspicious activity. If the control unit 107 does not detect the user's car in the driveway, the control unit 107 can be set to send an alert to a user's phone about the activity and also call the police. These are simply examples, and many other actions could be performed based on observed data within or near a property. Visual data, as well as audio and other forms of data, may be used from one or more other sensors to aid in the processing of any discontinuity by the control unit 107.

In some implementations, the discontinuity involves tracking a person. During tracking, a control unit can capture one or more features corresponding to the person. The one or more features can be represented by values that depend on the visual images captured by one or more cameras. If one or more values of a feature change by a certain degree, the control unit can label the change a discontinuity and proceed accordingly. In some cases, a threshold involving a number of values that make up a feature can be used to determine if a change is a discontinuity or not. The control unit can internally process the discontinuities to determine if the discontinuity is valid or send data to a user to determine if the discontinuity is valid. For example, the control unit can check a known occlusion database and search for a known occlusion corresponding to a visual discontinuity. The control unit can also send a notification to the user. The notification can include a data packet with an image or images of the supposed discontinuity. The user can either confirm that the discontinuity is valid, which can mean that the discontinuity is the result of normal operation or movement by legitimate persons on a property, or invalid, which can mean that the discontinuity is the result of a spoofing attack perpetrated by an illegitimate actor.

In some implementations, the control unit 107 determines whether a discontinuity is valid. For example, based on tracking data of the user 103 prior to the occlusion of the pillar 105 in the second image 104, the control unit 107 can predict when or where the user 103 should reappear. The control unit 107 can compare predictions, based at least on the tracking data and known occlusions, to subsequent captured data. For example, the control unit 107 can compare the predictions to data associated with the third image 106. For example, the control unit 107 can predict the user 103 should appear within a region that matches a location of the user 103 in the third image 106 at a time that matches a time when the third image 106 is captured. Based on at least the data associated with the third image, the control unit 107 can confirm the predictions and determine the discontinuity is valid.

In some implementations, the control unit 107 captures evidence based on a given discontinuity. For example, the control unit 107 can predict when a person might reappear after a given occlusion such as the user 103 being occluded by the pillar 105 in the second image 104. The control unit 107 may then detect a reappearance of the user 103. In some cases, the predicted time when the person should reappear does not exactly match the actual time of reappearance. The control unit 107 can save related data such as the predicted time and the actual time or a difference between the predicted time and the actual time among others. For example, it may take longer for the user 103 to reappear from behind the pillar 105 than predicted. Corresponding data may then be captured and used to inform a subsequent security state change. Other captured data may also be included in a determination of whether or not to escalate or de-escalate a given security state of the system 100. For example, a user can deviate from an expected path (e.g., straying from a walkway, suddenly changing direction resulting in a difference value between predicted future location and actual future location, among others). Based at least on the deviation from the expected path, a control unit such as the control unit 107 may escalate a security state of a system such as the system 100.

In some implementations, other features are determined by the control unit 107. For example, a clothing feature corresponding specifically to the clothing worn by a person approaching a property can be used. A given outfit can correspond to a first data set representing a first feature while a different outfit can correspond to a second data set representing a second feature.

In the example of FIG. 1A, the front door camera 101 captures multiple images and sends the multiple images to the control unit 107. The multiple images include the first image 102, the second image 104, and the third image 106. In some cases, a system variable can be used to determine when to send one or more images. For example, when local memory on the front door camera 101 fills 90% of available memory storage allocation, the front door camera 101 can offload stored data to the control unit 107. The stored data can be one or more images captured by the front door camera 101.

In some implementations, a timing variable is used to trigger the front door camera 101 sending one or more images to the control unit 107. For example, in the system 100, the front door camera 101 can send image data to the control unit 107 every 10 seconds. The front door camera 101 can send data after calculating a function. For example, system parameters stored within the system 100 can be used to calculate a Boolean value. The Boolean value can be used to determine whether to send images or not to send images.

In some implementations, the front door camera 101 sends the first image 102 to the control unit 107 before receiving the second image 104 or the third image 106. For example, the first image 102 is sent to the control unit 107 and the control unit 107 processes the first image 102. Object recognition is used to determine a person A within the first image 102. Data representing features of the person A, including body features, facial features, and the like, are generated and stored. The data representing the features of the person A can be stored in a data item corresponding to the first image 102 or the person A. The data representing features of the person A, or second data representing the particular event of the person A appearing on or near the property 124, can be stored and added to other sightings or similar data of other object recognitions.

In some implementations, the camera is placed in other areas of a property. For example, instead of a front door camera, a garage door camera may be used. In general, any camera placed on a property can be used to perform the processes within a configured system, e.g. the system 100.

Figure 2:
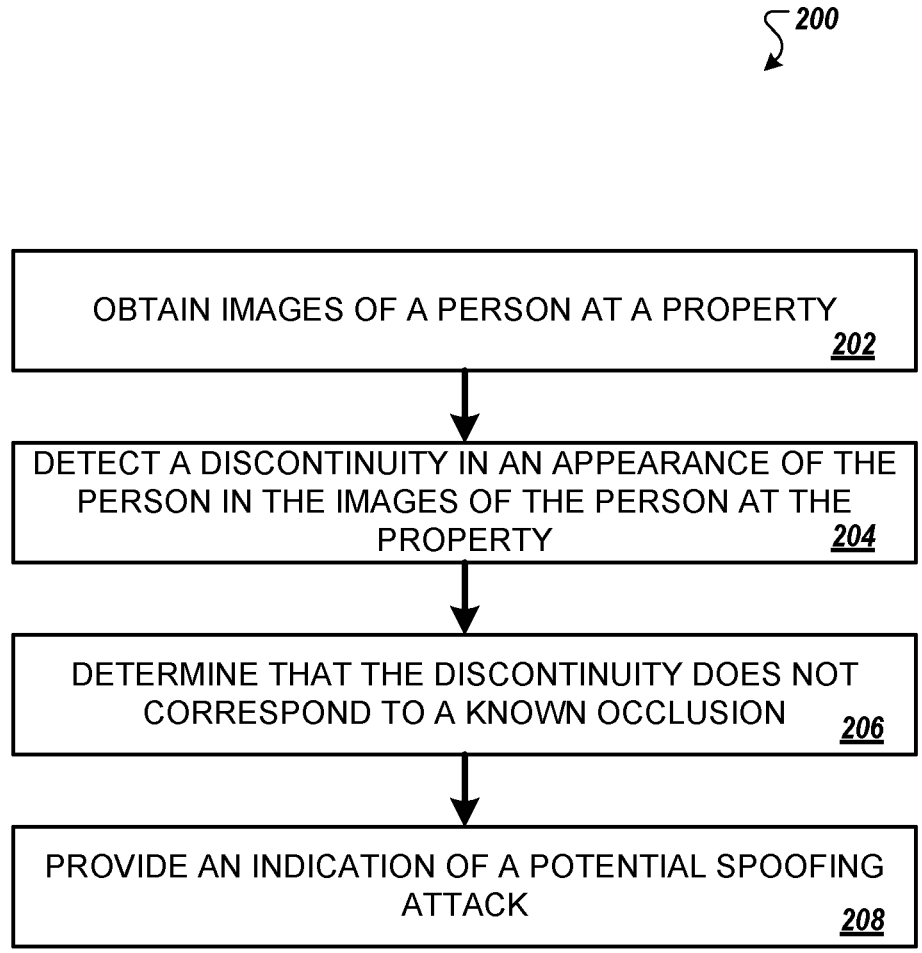
FIG. 2 is a flow diagram illustrating an example of a process for visual authentication detecting a user.

FIG. 2 is a flow diagram illustrating an example of a process 200 for visual authentication detecting a user. The process 200 can be applied to the system 100 of FIG. 1A and FIG. 1B.

The process 200 includes obtaining images of a person at a property (202). For example, the front door camera 101 captures the fourth image 130 and the fifth image 132 of the unauthorized user 406 as the unauthorized user 406 approaches the front door of the property 124. The front door camera 101 sends the fourth image 130 and the fifth image 132 to the control unit 107.

The process 200 includes detecting a discontinuity in an appearance of the person in the images of the person at the property (204). For example, the control unit 107 determines Facial Feature B can be applied to a person-looking object in the fourth image 130 whereas Facial Feature A can be applied to the person-looking object in the fifth image 132. The change in facial features determined by the control unit 107 is sufficient to trigger a discontinuity event.

In some implementations, detecting the discontinuity in the appearance of the person in the images of the person at the property may include determining, from a first image of the images, features of the person and determining, from a second image of the images, that the features of the person are not detected in the second image. For example, the control unit 107 can determine additional features related to Person A including a body feature and a facial feature. If one or more of the features determined for the Person A are present in a first image and not present in a second image, the control unit 107 may determine that a discontinuity has occurred.

In some implementations, although a determined feature may not be present in a subsequent image, a discontinuity may not be detected. For example, if a first group of features are determined for a person or scene (e.g., weather conditions, lighting, object detection of objects on property, among others) based, at least, on a first image and a second group of features are determined based on a second image, a control unit may determine, based on a comparison of the first group of features and the second group of features, whether a discontinuity has occurred. In one example, a person may turn their head. A facial feature may thus be different based on the person turning their head. Yet, if the facial feature difference does not satisfy a threshold or if one or more other determined features do satisfy a threshold, a discontinuity may not be detected. In this way, a system, such as the system 100, may prevent false positive triggers when features are not present but others are. Similarly, false positives may be prevented by comparing one or more values of determined features to quantify a difference between features detected in multiple images.

In some implementations, a comparison of one or more features may include referencing one or more weights that determine the influence of compared features. For example, a comparison of a first group of features and a second group of features, as described herein, may include weighting one or more comparisons. A discontinuity may be determined if a combination of one or more comparison values, weighted by one or more weights, satisfies a threshold. In some cases, a facial feature comparison may be weighted more than other features, such as background feature, body shape, among others.

In some implementations, a feature may be weighted more than other features if a particular comparison satisfies a threshold or if one or more features of the first group of features and the second group of features satisfy a threshold. For example, if the control unit 107 determines a facial feature for a detected person corresponding to a person A and determines a second facial feature for the same detected person corresponding to a person B, and both the determination of the facial feature and the second facial feature satisfies a confidence threshold, the control unit 107 may detect the change as a spoofing attack or the control unit 107 may increase the weighting of the facial feature comparison to increase a likelihood of detecting a spoofing attack. In this way, the control unit 107 may detect a spoofing attack if only a single feature is altered and other features between obtained images are the same or similar.

In some implementations, detecting the discontinuity in the appearance of the person in the images of the person may include determining a first feature from a first image of the images of the person, determining a second feature from a second image of the images of the person, wherein the second image is obtained subsequent to the first image, comparing the first feature to the second feature to determine a degree of similarity between the first feature and the second feature, and detecting the discontinuity based on the degree of similarity. For example, the control unit 107 can compare the facial and body features detected in the third image 106 and the first image 102 and determine, based on a degree of similarity between one or more values representing the facial and body features of the first image 102 and the third image 106, that the user has not changed appearance. Based on determining that the user has not changed appearance (e.g., by determining that the third image 106 indicates an object as a person who is not different than the same person indicated as the same object in the first image 102 even if one or more pixel values of the third image 106 and the first image 102 may be different), the control unit 107 can decrease a given likelihood that the given discontinuity event is a spoofing attack. Similarly, a comparison may be performed to determine that the user has changed appearance based on one or more thresholds for one or more feature comparisons.

In some implementations, detecting a discontinuity based on a degree of similarity may include determining that the degree of similarity satisfies a threshold, and detecting the discontinuity in response to determining that the degree of similarity satisfies the threshold. For example, a feature determined from an image may change from one or more values to a different one or more values. If the difference between the two sets of one or more values satisfies a threshold, a discontinuity may be detected. However, if a change of values occurs in a location corresponding to a known occlusion, as determined by searching an occlusion database, such as the occlusion database 116, a discontinuity may not be detected even if the difference between the two sets of one or more values satisfies a threshold.

In some implementations, comparing a first feature to the second feature to determine the degree of similarity between the first feature and the second feature may include comparing a first feature vector representing the first feature with a second feature vector representing the second feature. For example, vectors that include one or more numerical values may be compared using any known comparison technique, including calculating a distance between the vectors in a dimensional space. In some cases, each component of the vectors may be compared.

The process 200 includes determining that the discontinuity does not correspond to a known occlusion (206). For example, in the example of FIG. 1A, the control unit 107 queries the occlusion database 116 to determine that the user 103 was subject to a known occlusion of the pillar 105 between the user 103 and the front door camera 101. In FIG. 1B, the control unit 107 determines the facial feature of a detection object in the fourth image 130 and the fifth image 132 changes. In this example, the facial feature changing, in addition to object detection around the face of the detection object, does not correspond with any known occlusion stored within the occlusion database 116.

In some implementations, determining that the discontinuity does not correspond to a known occlusion may include determining a discontinuity location where the discontinuity occurred, determining that no known occlusion stored in a database corresponds to the discontinuity location, and determining that the discontinuity does not correspond to a known occlusion based on determining that no known occlusion stored in the database corresponds to the discontinuity location. For example, as shown in FIG. 1A, the control unit 107 may query the occlusion database 116 based on the data of the discontinuity event. By comparing data from one or more entries of the database, the control unit 107 may determine that the discontinuity does not correspond to a known occlusion.

In some implementations, determining that no known occlusion stored in the database corresponds to the discontinuity location may include comparing a location for each known occlusion stored in the database to the discontinuity location. For example, as discussed in reference to FIG. 1A, the control unit 107 may query the occlusion database 116 based on a location of a suspected discontinuity. If the location of the suspected discontinuity is stored within the database 116 as associated with a known occlusion, the control unit 107 may determine that the suspected discontinuity is actually a known occlusion. However, if the location of the suspected discontinuity is not stored within the database 116 as associated with any known occlusion, the control unit 107 may determine that the suspected discontinuity is in fact a discontinuity that requires further handling by one or more processes and may determine that the discontinuity is a potential spoofing attack. As discussed herein, a location of a discontinuity event may be represented as (X1, Y1; X2, Y2), where (X1, Y1; X2, Y2) represents a known location associated with known occlusions. Similarly represented locations may be stored in the database 116 to enable a direct comparison between the suspected discontinuity location and one or more locations associated with known occlusions.

Figure 6:
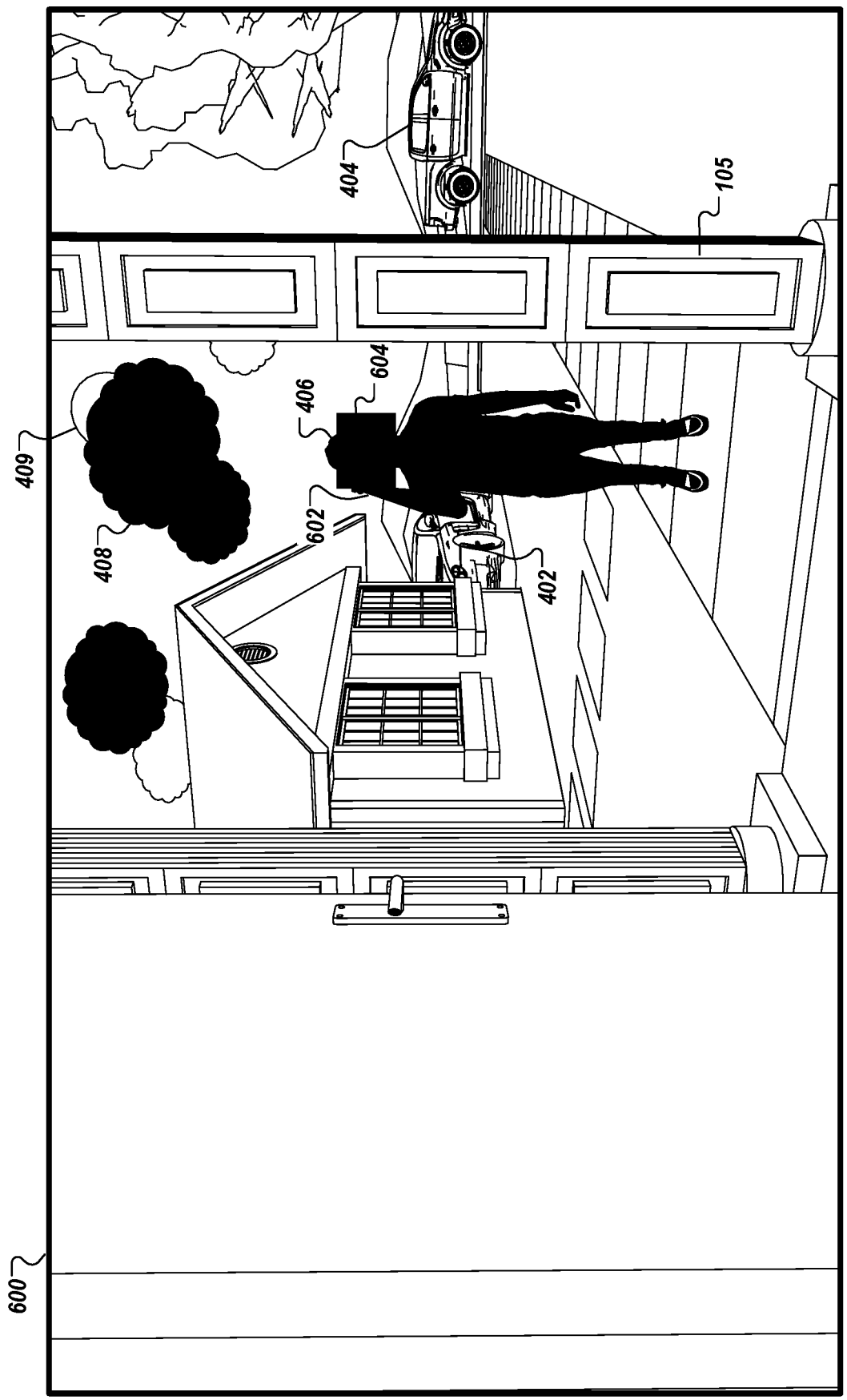
FIG. 6 is a third example representation of an image used for visual authentication.

In some implementations, face changes, or certain features detected around the face of a detection object such as the unauthorized user 406, is sufficient to generate a discontinuity event. For example, as shown in FIG. 6, the unauthorized user 406 is holding up an object over their face. The detection of the object raised to block the face of the unauthorized user 406 from the front door camera 101 together with the determination that the facial feature associated with the unauthorized user 406 has changed, is sufficient to trigger a discontinuity event. No similar known occlusions have been detected by the system 100.

The process 200 includes providing an indication of a potential spoofing attack (208). For example, in the example of FIG. 1B, the control unit 107 sends the alert 139 to the device of the user 140. The alert 139 provides an indication of the discontinuity. In this case, the discontinuity is a potential spoofing attack determined by the control unit 107. As discussed in reference to FIG. 1B, the control unit 107 similarly sends a signal to the property 124. The alert 139 sent to the device of the user 140 can be an interactive alert allowing the user 140 to respond and adjust any subsequent action performed by the control unit 107 in reference to the discontinuity event. In the example of FIG. 1B, the control unit 107 sends a signal to the property 124 to run a protocol. The protocol includes locking the doors and activating a secondary PIN authentication. The secondary PIN authentication can be an extra layer of security to prevent a spoofing attack from gaining entry to the property 124 solely based on visual facial recognition.

In some implementations, providing the indication of the potential spoofing attack may include processing data from sensors at the property and determining a technique for providing the indication of the potential spoofing attack based on processing the data from the sensors at the property. For example, the system 100 can be set so that if the control unit 107 detects a discontinuity that is potentially suspicious, and the control unit 107 also detects a user's car in the driveway, the control unit 107 can send an alert to a smart speaker inside the house that there is suspicious activity. If a car is not present, the control unit 107 may send an alert to a mobile device associated with a user. In general, the control unit 107 may use additional details based on obtained sensor data to determine what notification technique is suitable. The control unit 107 may determine, based on a list of possible notification techniques, which may be managed by a user, which notification technique, or multiple techniques, to use in a situation.

In some implementations, the indication of the potential spoofing attack includes a confidence value. For example, the control unit 107 can generate a confidence value associated with the potential spoofing attack. The confidence value can be informed by data received from one or more sensors. The control unit 107 can use forms of machine learning to generate a spoofing indication and confidence value based on previously determined spoofing attacks. The control unit can use feedback from one or more users, owners, or central stations communicably connected to inform the confidence value or determination of a spoofing attack.

In some implementations, the process 200 may further include after determining that the discontinuity does not correspond to a known occlusion, sending a signal configured to obtain data from one or more sensors. For example, if a suspected discontinuity is not likely a known occlusion, as determined by a control unit, such as the control unit 107 of FIG. 1A, the control unit may obtain additional sensor data from the property. The additional sensor data from the property may be processed to determine one or more features. Based, at least on the determined one or more features, the control unit may determine that the suspected discontinuity is an actual discontinuity. The control unit may configure an alert for a user of the system. The control unit may configure a signal for one or more electronic processes on the property.

In some implementations, providing the indication of the potential spoofing attack may include providing data from one or more sensors to a user. For example, as discussed herein, a control unit, such as the control unit 107 of FIG. 1A, may obtain data from one or more sensors. The control unit may obtain the data in response to one or more determinations, such as determining that the discontinuity does not correspond to a known occlusion. The control unit may then send the data to a user as part of a notification detailing the potential spoofing attack. The notification may be sent in any suitable manner to a user of the property.

In some implementations, the process 200 may further include receiving a request from a user in response to providing the indication of the potential spoofing attack. For example, a user may use one or more devices to respond to the indication of the potential spoofing attack. The response may be configured to trigger a control unit, such as the control unit 107, to obtain more sensor data, trigger an electronic process, such as locking or unlocking a door, activating a microphone, camera, or other sensor, among others. In some cases, sensor data obtained at a property may be obtained from one or more sensors affixed to a drone.

In some implementations, the process 200 may further include triggering an automatic door unlocking device configured to run a protocol for unlocking or locking a door of the property. For example, after providing the indication of the potential spoofing attack or receiving validation information, such as information provided by a user of the system, subsequent sensor data, among others, a control unit, such as the control unit 107, may trigger an automatic door unlocking device configured to run a protocol for unlocking or locking a door of the property. The control unit may trigger the automatic door unlocking device to lock a door of the property if the validation information includes an indication satisfying a threshold, such as indicating that the spoofing attack is real or is deemed a threat or suspicious, among others. The control unit may trigger the automatic door unlocking device to lock a door of the property if the validation information includes an indication satisfying a different threshold, such as indicating that the spoofing attack is not real or is not deemed a threat or suspicious, among others.

In some implementations, the process 200 may further include changing a security state of an alarm system of the property. For example, the control unit 107 may set a security state variable. The security state variable may represent a current security state of the system 100. For example, if a spoofing attack was detected near the property 124, the control unit 107 may change the security state to an escalated state. An escalated state can be associated with additional security measures among other things. In some cases, transitions from one security state to another can result in specific actions taking place, such as automatic door locking, emergency personnel notifications or requests, or user notifications or requests.

Figure 3:
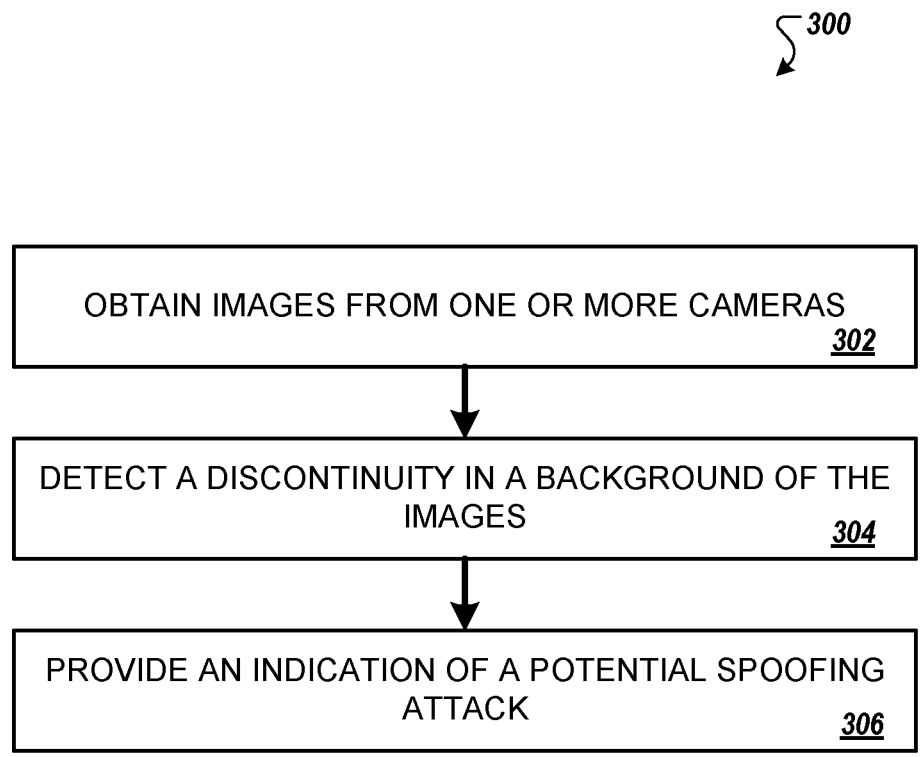
FIG. 3 is a flow diagram illustrating an example of a process for visual authentication detecting a background.

FIG. 3 is a flow diagram illustrating an example of a process for visual authentication detecting a background. The process 300 can be applied to the system 100 of FIG. 1A and FIG. 1B. Additional aspects related to the process 300 are discussed in reference to FIG. 4, FIG. 5 and FIG. 6.

The process 300 includes obtaining images from one or more cameras (302). For example, FIG. 1A describes the front door camera 101 capturing the first image 102, the second image 104, and the third image 106. In some cases, the user 103 may not be visible or one or more images may be captured before the user 103 is visible. The one or more images captured before the user 103 is visible can be used to determine a background discontinuity.

Figure 4:
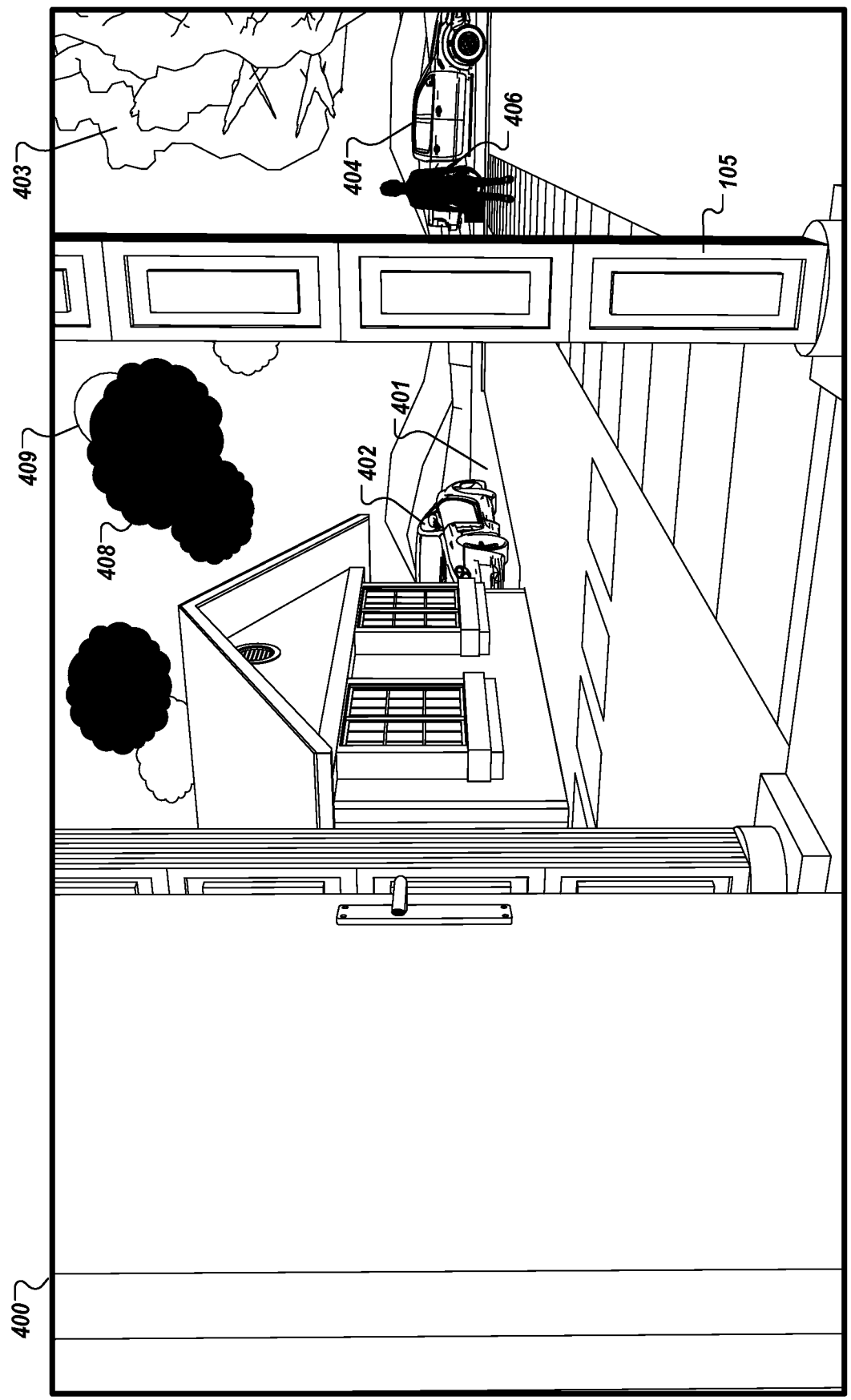
FIG. 4 is an example representation of an image used for visual authentication.
Figure 5:
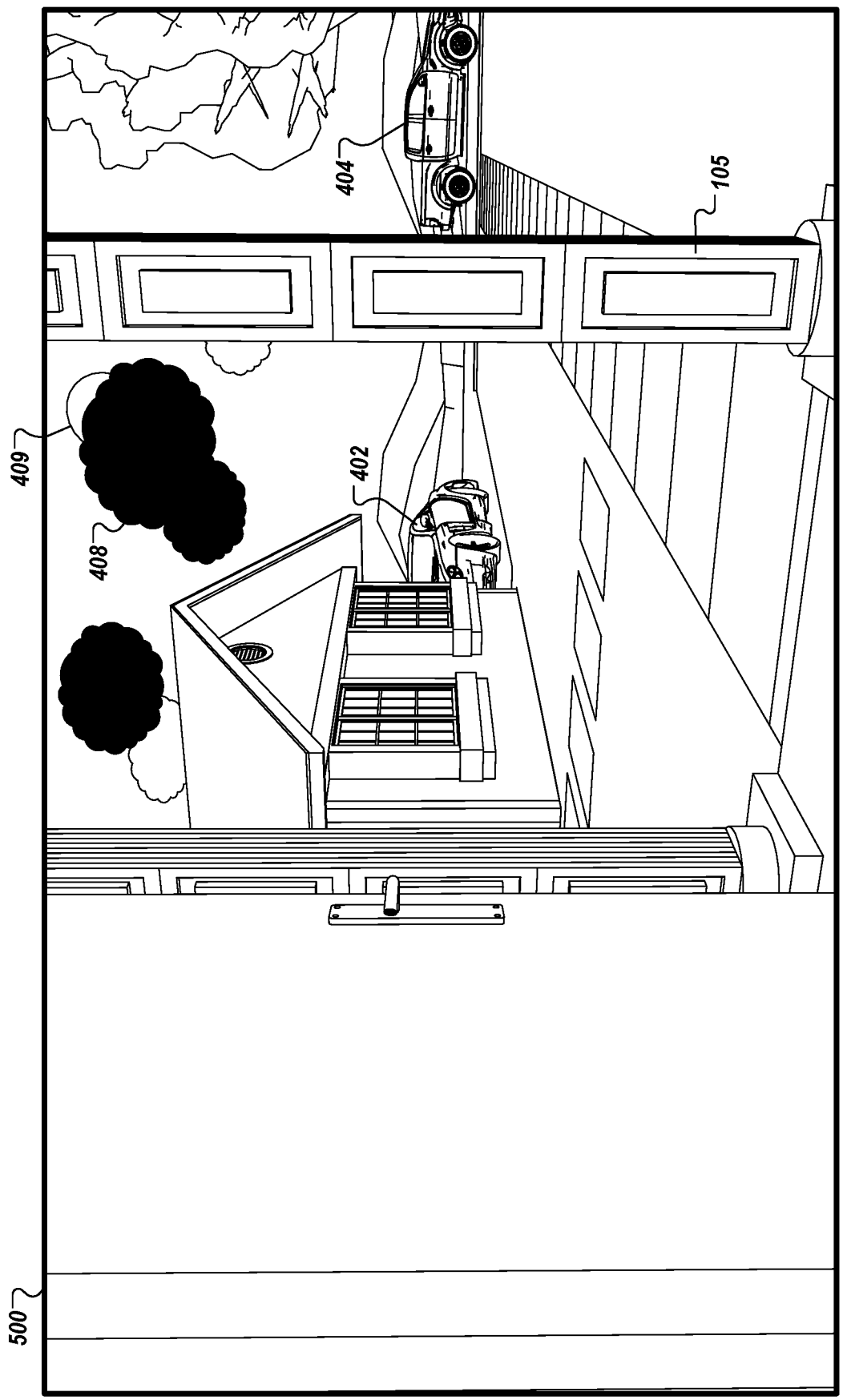
FIG. 5 is a second example representation of an image used for visual authentication.

The process 300 includes detecting a discontinuity in a background of the images (304). For example, in a first image of the one or more images captured before the user 103 is visible, a first background can be detected. The first background may contain a feature vector describing in vector or matrix format, various visual elements captured in the first image. As shown in FIG. 4, FIG. 5, and FIG. 6, the visual elements can include a car parked in the driveway, weather including cloud coverage and the amount or type of light detected, cars parked in the street, or other similar features. The feature vector, or multiple feature vectors, determined based on a visual analysis of the first image detailing the first background can then be compared to a second background. The second background can be detected based on a second image of the one or more images captured before the user 103 is visible. The second background can similarly be described with one or more feature vectors. Values representing the feature vectors of the first background can be compared with values representing the features vectors of the second background to generate one or more difference vectors. Based on the one or more difference vectors, a discontinuity event can be generated.

In some implementations, a feature vector includes one or more weight values. The one or more weight values can be associated with machine learning input or output. For example, a machine learning algorithm can be used to determine aspects or elements within an image. Output from the process of determining features within the image can be a set of data items with weights. The one or more weights can provide an indication as to the visual elements detected by the process. The weights of one or more detections can be compared to generate a difference value used for discontinuity detection.

In some implementations, a bad actor may use recorded footage or change the images being captured on a property. The bad actor may then attempt various illegal activities such as a break-in or theft. In some cases, a switch to recorded footage or image processing techniques may result in certain features changing from a first image to a second image. For example, a car may appear in the driveway in the first image and then not be in the driveway in the second image. Clouds may shift from one position in the first image to a different position in the second image. Changes over a threshold can be sufficient to trigger a discontinuity event.

The process 300 includes providing an indication of a potential spoofing attack (306). For example, the control unit 107 can send an alert to a user corresponding to the system 100. The alert can contain relevant data based on the discontinuity event. For example, the data can contain the first image and the second image where the discontinuity was detected. The user can then decide if the discontinuity is a potential spoofing attack and what subsequent actions should be performed. In some cases, the control unit 107 can determine if the discontinuity warrants specific actions related to a potential spoofing attack by correlating data of the current discontinuity with data of previously determined discontinuities within the system 100 or other systems stored on data communicably connected to the system 100. In some cases, a network of systems can share data on potential spoofing attacks to prevent bad actors from using similar spoofing techniques on multiple properties.

In some implementations, one or more images are captured while a user, such as the user 103, is visible and the one or more images are similarly used to detect a discontinuity in the background. The discontinuity may then be used to trigger a discontinuity event and an alert responsive to the potential spoofing attack.

FIG. 4 is an example representation of an image 400 used for visual authentication. The image 400 corresponds to an image preceding the fourth image 130 shown in FIG. 1B. The image 400 is captured by the front door camera 101 and shows the unauthorized user 406 walking towards the front door of the property 124. The image 400 is a detail view of other objects to be identified by a control unit such as the control unit 107 of the system 100. FIG. 4 shows a first car 402 parked in a driveway 401. A second car 404 is parked on a street in view of the front door camera 101. A tree 403 and a cloud 408 partially obscuring the sun 409 are also shown within the FIG. 4. The pillar 105 as shown in FIG. 1A is also shown.

In some implementations, the control unit 107 detects one or more of the items shown and uses data related to the detections to inform subsequent discontinuity event triggering. For example, the control unit 107 can detect the first car 402 in the driveway 401. The control unit 107 can store data detailing the event is related to a user being on the premises. As a result, if a related alert where to be sent, the control unit 107 can use the information that the user is on the premises of the property 124 to send relevant alerts. For example, the control unit 107 can send an audio alert to a smart speaker in the living room of the property 124. If the first car 402 was not detected, the control unit 107 can send a signal to a phone of the user instead. In some cases, multiple alerts can be sent based on a given situation. For example, an alert sent to a connected device such as a smart speaker can be sent in addition to another alert such as an alert sent to a smartphone of the user.

FIG. 5 is a second example representation of an image 500 used for visual authentication. The image 500 corresponds to another image preceding the fourth image 130 shown in FIG. 1B. The image 500 shows the unauthorized user 406 behind the pillar 105. In a similar manner as the process shown in FIG. 1A, the unauthorized user 406 walks towards the front door of the property 124 and is occluded by the pillar 105. As shown in FIG. 1A, the control unit 107, based on a captured image, can determine that the resulting discontinuity is a known occlusion based on querying the occlusion database 116.

FIG. 6 is a third example representation of an image 600 used for visual authentication. The image 600 includes a more detailed view of the fifth image 132 shown in FIG. 1B. The image 600 shows the unauthorized user 406 holding a picture 604 with an arm 602 over their face. The picture 604 in this example of a picture of a different face. The picture 604 represents a spoofing attack on the system. The authorized user is showing the front door camera 101 an image of the user 103 who is authorized and corresponds to the Facial Feature A that is sufficient for authentication.

The control unit 107 can detect various elements of the image 600 and determine, based on the detected various elements that the discontinuity event exists and the discontinuity event is a likely spoofing attack. For example, the control unit 107 can determine that the arm 602 of the unauthorized user 406 is raised near the head of the unauthorized user 406. This can represent one of many possible indicators that can increase a generated likelihood of a spoofing attack. A raised arm to head can represent a set value. The summation of one or more values representing indicators can be used to generate a relative likelihood of a spoofing attack in a given situation.

In another example, the control unit 107 can determine that the borders of the foreground related to the face of the unauthorized user 406 appear rectangular or extend further than normal from the expected size of the head given a position of the unauthorized user 406. In some cases, the object use to spoof the system 100 can be a piece of paper, an electronic device displaying an image or video footage, or another electronic device meant to disrupt or otherwise fool the front door camera 101 or the control unit 107 during processing.

In some cases, the system 100 can detect a mask being worn. For example, a similar comparison between a first image and a second image can result in a difference value between a first facial feature and a second facial feature. The difference value, if above a certain threshold, can be sufficient to trigger a discontinuity event. Based on other determined objects or features, the control unit 107 can determine if the discontinuity event is a potential spoofing attack, a known occlusion or other event-based on system settings. The other determined objects or features can include, depending on implementation, recognized shapes near or on the head, background discontinuities, placement of the hands, or any other feature detected and analyzed by the control unit 107. Specific determined objects or features used for discontinuity event determination or spoofing attack determination can be configured in system settings and predetermined by either the system 100 or a user of the system.

Figure 7:
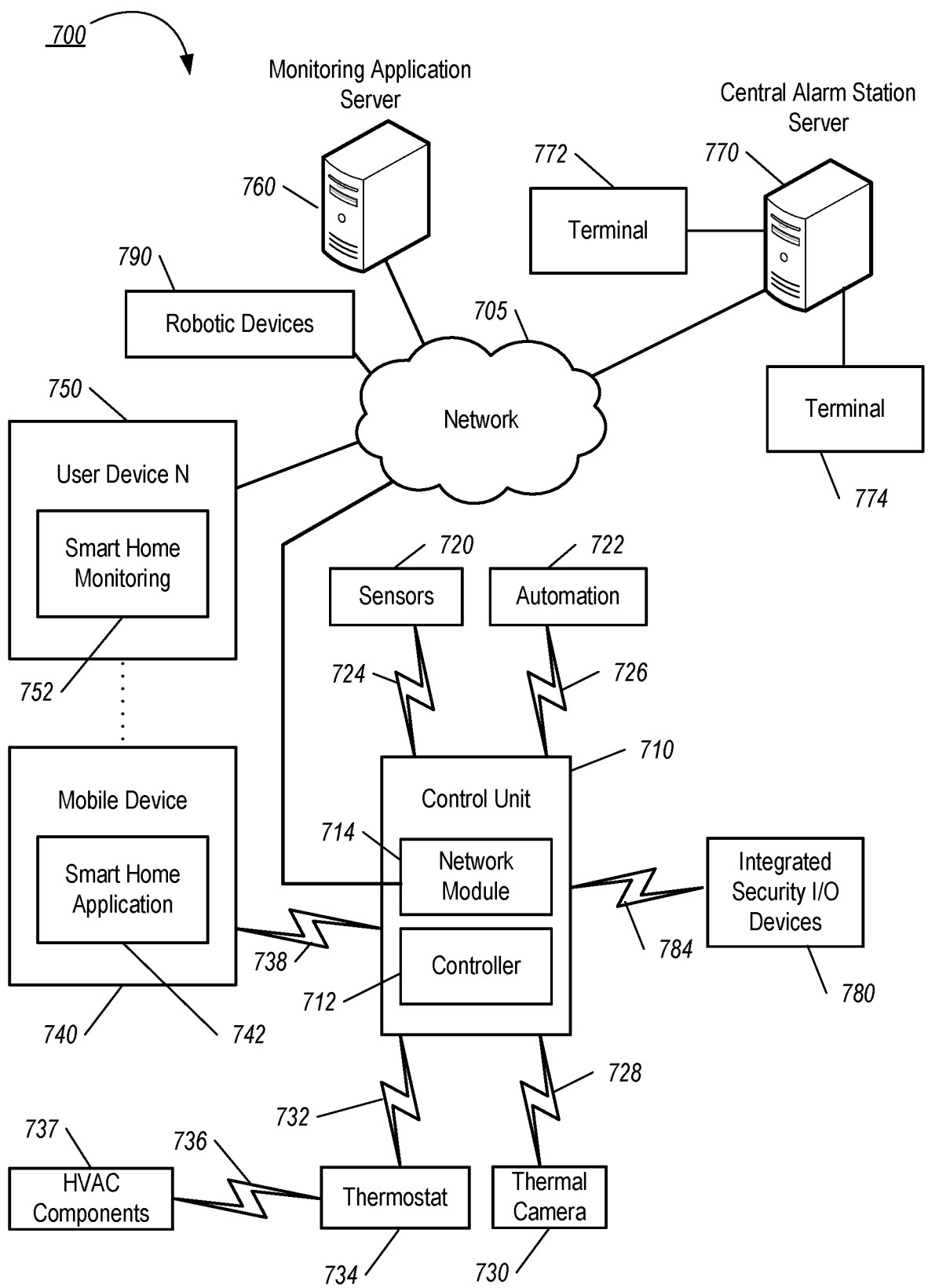
FIG. 7 is a diagram illustrating an example of a property monitoring system.

FIG. 7 is a diagram illustrating an example of a property monitoring system. The network 705 is configured to enable exchange of electronic communications between devices connected to the network 705. For example, the network 705 may be configured to enable exchange of electronic communications between the control unit 710, the one or more user devices 740 and 750, the monitoring server 760, and the central alarm station server 770. The network 705 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 705 may include multiple networks or subnetworks, each of which may include, for example, a wired or wireless data pathway. The network 705 may include a circuit-switched network, a packet-switched data network, or any other network able to carry electronic communications (e.g., data or voice communications). For example, the network 705 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 705 may include one or more networks that include wireless data channels and wireless voice channels. The network 705 may be a wireless network, a broadband network, or a combination of networks including a wireless network and a broadband network.

The control unit 710 includes a controller 712 and a network module 714. The controller 712 is configured to control a control unit monitoring system (e.g., a control unit system) that includes the control unit 710. In some examples, the controller 712 may include a processor or other control circuitry configured to execute instructions of a program that controls operation of a control unit system. In these examples, the controller 712 may be configured to receive input from sensors, flow meters, or other devices included in the control unit system and control operations of devices included in the household (e.g., speakers, lights, doors, etc.). For example, the controller 712 may be configured to control operation of the network module 714 included in the control unit 710.

The network module 714 is a communication device configured to exchange communications over the network 705. The network module 714 may be a wireless communication module configured to exchange wireless communications over the network 705. For example, the network module 714 may be a wireless communication device configured to exchange communications over a wireless data channel and a wireless voice channel. In this example, the network module 714 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 714 also may be a wired communication module configured to exchange communications over the network 705 using a wired connection. For instance, the network module 714 may be a modem, a network interface card, or another type of network interface device. The network module 714 may be an Ethernet network card configured to enable the control unit 710 to communicate over a local area network and/or the Internet. The network module 714 also may be a voice band modem configured to enable the alarm panel to communicate over the telephone lines of Plain Old Telephone Systems (POTS).

The control unit system that includes the control unit 710 includes one or more sensors 720. For example, the monitoring system may include multiple sensors 720. The sensors 720 may include a lock sensor, a contact sensor, a motion sensor, or any other type of sensor included in a control unit system. The sensors 720 also may include an environmental sensor, such as a temperature sensor, a water sensor, a rain sensor, a wind sensor, a light sensor, a smoke detector, a carbon monoxide detector, an air quality sensor, etc. The sensors 720 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data.

The sensors 720 can also include a radio-frequency identification (RFID) sensor that identifies a particular article that includes a pre-assigned RFID tag.

The system 700 also includes one or more thermal cameras 730 that communicate with the control unit 710. The thermal camera 730 may be an IR camera or other type of thermal sensing device configured to capture thermal images of a scene. For instance, the thermal camera 730 may be configured to capture thermal images of an area within a building or home monitored by the control unit 710. The thermal camera 730 may be configured to capture single, static thermal images of the area and also video thermal images of the area in which multiple thermal images of the area are captured at a relatively high frequency (e.g., thirty images per second). The thermal camera 730 may be controlled based on commands received from the control unit 710. In some implementations, the thermal camera 730 can be an IR camera that captures thermal images by sensing radiated power in one or more IR spectral bands, including NIR, SWIR, MWIR, and/or LWIR spectral bands.

The thermal camera 730 may be triggered by several different types of techniques. For instance, a Passive Infra-Red (PIR) motion sensor may be built into the thermal camera 730 and used to trigger the thermal camera 730 to capture one or more thermal images when motion is detected. The thermal camera 730 also may include a microwave motion sensor built into the camera and used to trigger the thermal camera 730 to capture one or more thermal images when motion is detected. The thermal camera 730 may have a "normally open" or "normally closed" digital input that can trigger capture of one or more thermal images when external sensors (e.g., the sensors 720, PIR, door/window, etc.) detect motion or other events. In some implementations, the thermal camera 730 receives a command to capture an image when external devices detect motion or another potential alarm event. The thermal camera 730 may receive the command from the controller 712 or directly from one of the sensors 720.

In some examples, the thermal camera 730 triggers integrated or external illuminators (e.g., Infra-Red or other lights controlled by the property automation controls 722, etc.) to improve image quality. An integrated or separate light sensor may be used to determine if illumination is desired and may result in increased image quality.

The thermal camera 730 may be programmed with any combination of time/day schedules, monitoring system status (e.g., "armed stay," "armed away," "unarmed"), or other variables to determine whether images should be captured or not when triggers occur. The thermal camera 730 may enter a low-power mode when not capturing images. In this case, the thermal camera 730 may wake periodically to check for inbound messages from the controller 712. The thermal camera 730 may be powered by internal, replaceable batteries if located remotely from the control unit 710. The thermal camera 730 may employ a small solar cell to recharge the battery when light is available. Alternatively, the thermal camera 730 may be powered by the controller's 712 power supply if the thermal camera 730 is co-located with the controller 712.

In some implementations, the thermal camera 730 communicates directly with the monitoring server 760 over the Internet. In these implementations, thermal image data captured by the thermal camera 730 does not pass through the control unit 710 and the thermal camera 730 receives commands related to operation from the monitoring server 760.

In some implementations, the system 700 includes one or more visible light cameras, which can operate similarly to the thermal camera 730, but detect light energy in the visible wavelength spectral bands. The one or more visible light cameras can perform various operations and functions within the property monitoring system 700. For example, the visible light cameras can capture images of one or more areas of the property, which the cameras, the control unit, and/or another computer system of the monitoring system 700 can process and analyze.

The system 700 also includes one or more property automation controls 722 that communicate with the control unit to perform monitoring. The property automation controls 722 are connected to one or more devices connected to the system 700 and enable automation of actions at the property. For instance, the property automation controls 722 may be connected to one or more lighting systems and may be configured to control operation of the one or more lighting systems. Also, the property automation controls 722 may be connected to one or more electronic locks at the property and may be configured to control operation of the one or more electronic locks (e.g., control Z-Wave locks using wireless communications in the Z-Wave protocol). Further, the property automation controls 722 may be connected to one or more appliances at the property and may be configured to control operation of the one or more appliances. The property automation controls 722 may include multiple modules that are each specific to the type of device being controlled in an automated manner. The property automation controls 722 may control the one or more devices based on commands received from the control unit 710. For instance, the property automation controls 722 may interrupt power delivery to a particular outlet of the property or induce movement of a smart window shade of the property.

The system 700 also includes thermostat 734 to perform dynamic environmental control at the property. The thermostat 734 is configured to monitor temperature and/or energy consumption of an HVAC system associated with the thermostat 734, and is further configured to provide control of environmental (e.g., temperature) settings. In some implementations, the thermostat 734 can additionally or alternatively receive data relating to activity at the property and/or environmental data at the home, e.g., at various locations indoors and outdoors at the property. The thermostat 734 can directly measure energy consumption of the HVAC system associated with the thermostat, or can estimate energy consumption of the HVAC system associated with the thermostat 734, for example, based on detected usage of one or more components of the HVAC system associated with the thermostat 734. The thermostat 734 can communicate temperature and/or energy monitoring information to or from the control unit 710 and can control the environmental (e.g., temperature) settings based on commands received from the control unit 710.

In some implementations, the thermostat 734 is a dynamically programmable thermostat and can be integrated with the control unit 710. For example, the dynamically programmable thermostat 734 can include the control unit 710, e.g., as an internal component to the dynamically programmable thermostat 734. In addition, the control unit 710 can be a gateway device that communicates with the dynamically programmable thermostat 734. In some implementations, the thermostat 734 is controlled via one or more property automation controls 722.

In some implementations, a module 737 is connected to one or more components of an HVAC system associated with the property, and is configured to control operation of the one or more components of the HVAC system. In some implementations, the module 737 is also configured to monitor energy consumption of the HVAC system components, for example, by directly measuring the energy consumption of the HVAC system components or by estimating the energy usage of the one or more HVAC system components based on detecting usage of components of the HVAC system. The module 737 can communicate energy monitoring information and the state of the HVAC system components to the thermostat 734 and can control the one or more components of the HVAC system based on commands received from the thermostat 734.

In some examples, the system 700 further includes one or more robotic devices 790. The robotic devices 790 may be any type of robot that are capable of moving and taking actions that assist in home monitoring. For example, the robotic devices 790 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and/or roll along the ground, walls, or ceiling) and land vehicle type devices (e.g., automated cars that drive around a property). In some cases, the robotic devices 790 may be robotic devices 790 that are intended for other purposes and merely associated with the system 700 for use in appropriate circumstances. For instance, a robotic vacuum cleaner device may be associated with the monitoring system 700 as one of the robotic devices 790 and may be controlled to take action responsive to monitoring system events.

In some examples, the robotic devices 790 automatically navigate within a property. In these examples, the robotic devices 790 include sensors and control processors that guide movement of the robotic devices 790 within the property. For instance, the robotic devices 790 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 790 may include control processors that process output from the various sensors and control the robotic devices 790 to move along a path that reaches the desired destination and avoids obstacles. In this regard, the control processors detect walls or other obstacles in the property and guide movement of the robotic devices 790 in a manner that avoids the walls and other obstacles.

In addition, the robotic devices 790 may store data that describes attributes of the property. For instance, the robotic devices 790 may store a floorplan of a building on the property and/or a three-dimensional model of the property that enables the robotic devices 790 to navigate the property. During initial configuration, the robotic devices 790 may receive the data describing attributes of the property, determine a frame of reference to the data (e.g., a property or reference location in the property), and navigate the property based on the frame of reference and the data describing attributes of the property. Further, initial configuration of the robotic devices 790 also may include learning of one or more navigation patterns in which a user provides input to control the robotic devices 790 to perform a specific navigation action (e.g., fly to an upstairs bedroom and spin around while capturing video and then return to a home charging base). In this regard, the robotic devices 790 may learn and store the navigation patterns such that the robotic devices 790 may automatically repeat the specific navigation actions upon a later request.

In some examples, the robotic devices 790 may include data capture and recording devices. In these examples, the robotic devices 790 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users at the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 790 to take and store a biometric sample that can be used to identify the person (e.g., a biometric sample with DNA that can be used for DNA testing).

In some implementations, one or more of the thermal cameras 730 may be mounted on one or more of the robotic devices 790.

In some implementations, the robotic devices 790 may include output devices. In these implementations, the robotic devices 790 may include one or more displays, one or more speakers, and/or any type of output devices that allow the robotic devices 790 to communicate information to a nearby user.

The robotic devices 790 also may include a communication module that enables the robotic devices 790 to communicate with the control unit 710, each other, and/or other devices. The communication module may be a wireless communication module that allows the robotic devices 790 to communicate wirelessly. For instance, the communication module may be a Wi-Fi module that enables the robotic devices 790 to communicate over a local wireless network at the property. The communication module further may be a 900 MHz wireless communication module that enables the robotic devices 790 to communicate directly with the control unit 710. Other types of short-range wireless communication protocols, such as Bluetooth, Bluetooth LE, Z-wave, Zigbee, etc., may be used to allow the robotic devices 790 to communicate with other devices in the property. In some implementations, the robotic devices 790 may communicate with each other or with other devices of the system 700 through the network 705.

The robotic devices 790 further may include processor and storage capabilities. The robotic devices 790 may include any suitable processing devices that enable the robotic devices 790 to operate applications and perform the actions described throughout this disclosure. In addition, the robotic devices 790 may include solid state electronic storage that enables the robotic devices 790 to store applications, configuration data, collected sensor data, and/or any other type of information available to the robotic devices 790.

The robotic devices 790 can be associated with one or more charging stations. The charging stations may be located at predefined home base or reference locations at the property. The robotic devices 790 may be configured to navigate to the charging stations after completion of tasks needed to be performed for the monitoring system 700. For instance, after completion of a monitoring operation or upon instruction by the control unit 710, the robotic devices 790 may be configured to automatically fly to and land on one of the charging stations. In this regard, the robotic devices 790 may automatically maintain a fully charged battery in a state in which the robotic devices 790 are ready for use by the monitoring system 700.

The charging stations may be contact-based charging stations and/or wireless charging stations. For contact-based charging stations, the robotic devices 790 may have readily accessible points of contact that the robotic devices 790 are capable of positioning and mating with a corresponding contact on the charging station. For instance, a helicopter type robotic device 790 may have an electronic contact on a portion of its landing gear that rests on and mates with an electronic pad of a charging station when the helicopter type robotic device 790 lands on the charging station. The electronic contact on the robotic device 790 may include a cover that opens to expose the electronic contact when the robotic device 790 is charging and closes to cover and insulate the electronic contact when the robotic device is in operation.

For wireless charging stations, the robotic devices 790 may charge through a wireless exchange of power. In these cases, the robotic devices 790 need only locate themselves closely enough to the wireless charging stations for the wireless exchange of power to occur. In this regard, the positioning needed to land at a predefined home base or reference location in the property may be less precise than with a contact based charging station. Based on the robotic devices 790 landing at a wireless charging station, the wireless charging station outputs a wireless signal that the robotic devices 790 receive and convert to a power signal that charges a battery maintained on the robotic devices 790.

In some implementations, each of the robotic devices 790 has a corresponding and assigned charging station such that the number of robotic devices 790 equals the number of charging stations. In these implementations, the robotic devices 790 always navigate to the specific charging station assigned to that robotic device. For instance, a first robotic device 790 may always use a first charging station and a second robotic device 790 may always use a second charging station.

In some examples, the robotic devices 790 may share charging stations. For instance, the robotic devices 790 may use one or more community charging stations that are capable of charging multiple robotic devices 790. The community charging station may be configured to charge multiple robotic devices 790 in parallel. The community charging station may be configured to charge multiple robotic devices 790 in serial such that the multiple robotic devices 790 take turns charging and, when fully charged, return to a predefined home base or reference location in the property that is not associated with a charger. The number of community charging stations may be less than the number of robotic devices 790.

Also, the charging stations may not be assigned to specific robotic devices 790 and may be capable of charging any of the robotic devices 790. In this regard, the robotic devices 790 may use any suitable, unoccupied charging station when not in use. For instance, when one of the robotic devices 790 has completed an operation or is in need of battery charge, the control unit 710 references a stored table of the occupancy status of each charging station and instructs the robotic device 790 to navigate to the nearest charging station that is unoccupied.

The system 700 further includes one or more integrated security devices 780. The one or more integrated security devices may include any type of device used to provide alerts based on received sensor data. For instance, the one or more control units 710 may provide one or more alerts to the one or more integrated security input/output devices 780. Additionally, the one or more control units 710 may receive one or more sensor data from the sensors 720 and determine whether to provide an alert to the one or more integrated security input/output devices 780.

The sensors 720, the property automation controls 722, the thermal camera 730, the thermostat 734, and the integrated security devices 780 may communicate with the controller 712 over communication links 724, 726, 728, 732, and 784. The communication links 724, 726, 728, 732, and 784 may be a wired or wireless data pathway configured to transmit signals from the sensors 720, the property automation controls 722, the thermal camera 730, the thermostat 734, and the integrated security devices 780 to the controller 712. The sensors 720, the property automation controls 722, the thermal camera 730, the thermostat 734, and the integrated security devices 780 may continuously transmit sensed values to the controller 712, periodically transmit sensed values to the controller 712, or transmit sensed values to the controller 712 in response to a change in a sensed value.

The communication links 724, 726, 728, 732, and 784 may include a local network. The sensors 720, the property automation controls 722, the thermal camera 730, the thermostat 734, and the integrated security devices 780, and the controller 712 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 7 (CAT5) or Category 6 (CAT6) wired Ethernet network. The local network may be a mesh network constructed based on the devices connected to the mesh network.

The monitoring server 760 is one or more electronic devices configured to provide monitoring services by exchanging electronic communications with the control unit 710, the one or more user devices 740 and 750, and the central alarm station server 770 over the network 705. For example, the monitoring server 760 may be configured to monitor events (e.g., alarm events) generated by the control unit 710. In this example, the monitoring server 760 may exchange electronic communications with the network module 714 included in the control unit 710 to receive information regarding events (e.g., alerts) detected by the control unit 710. The monitoring server 760 also may receive information regarding events (e.g., alerts) from the one or more user devices 740 and 750.

In some examples, the monitoring server 760 may route alert data received from the network module 714 or the one or more user devices 740 and 750 to the central alarm station server 770. For example, the monitoring server 760 may transmit the alert data to the central alarm station server 770 over the network 705.

The monitoring server 760 may store sensor data, thermal image data, and other monitoring system data received from the monitoring system and perform analysis of the sensor data, thermal image data, and other monitoring system data received from the monitoring system. Based on the analysis, the monitoring server 760 may communicate with and control aspects of the control unit 710 or the one or more user devices 740 and 750.

The monitoring server 760 may provide various monitoring services to the system 700. For example, the monitoring server 760 may analyze the sensor, thermal image, and other data to determine an activity pattern of a resident of the property monitored by the system 700. In some implementations, the monitoring server 760 may analyze the data for alarm conditions or may determine and perform actions at the property by issuing commands to one or more of the automation controls 722, possibly through the control unit 710.

The central alarm station server 770 is an electronic device configured to provide alarm monitoring service by exchanging communications with the control unit 710, the one or more mobile devices 740 and 750, and the monitoring server 760 over the network 705. For example, the central alarm station server 770 may be configured to monitor alerting events generated by the control unit 710. In this example, the central alarm station server 770 may exchange communications with the network module 714 included in the control unit 710 to receive information regarding alerting events detected by the control unit 710. The central alarm station server 770 also may receive information regarding alerting events from the one or more mobile devices 740 and 750 and/or the monitoring server 760.

The central alarm station server 770 is connected to multiple terminals 772 and 774. The terminals 772 and 774 may be used by operators to process alerting events. For example, the central alarm station server 770 may route alerting data to the terminals 772 and 774 to enable an operator to process the alerting data. The terminals 772 and 774 may include general-purpose computers (e.g., desktop personal computers, workstations, or laptop computers) that are configured to receive alerting data from a server in the central alarm station server 770 and render a display of information based on the alerting data. For instance, the controller 712 may control the network module 714 to transmit, to the central alarm station server 770, alerting data indicating that a sensor 720 detected motion from a motion sensor via the sensors 720. The central alarm station server 770 may receive the alerting data and route the alerting data to the terminal 772 for processing by an operator associated with the terminal 772. The terminal 772 may render a display to the operator that includes information associated with the alerting event (e.g., the lock sensor data, the motion sensor data, the contact sensor data, etc.) and the operator may handle the alerting event based on the displayed information.

In some implementations, the terminals 772 and 774 may be mobile devices or devices designed for a specific function. Although FIG. 7 illustrates two terminals for brevity, actual implementations may include more (and, perhaps, many more) terminals.

The one or more authorized user devices 740 and 750 are devices that host and display user interfaces. For instance, the user device 740 is a mobile device that hosts or runs one or more native applications (e.g., the smart home application 742). The user device 740 may be a cellular phone or a non-cellular locally networked device with a display. The user device 740 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 740 may perform functions unrelated to the monitoring system, such as placing personal telephone calls, playing music, playing video, displaying pictures, browsing the Internet, maintaining an electronic calendar, etc.

The user device 740 includes a smart home application 742. The smart home application 742 refers to a software/firmware program running on the corresponding mobile device that enables the user interface and features described throughout. The user device 740 may load or install the smart home application 742 based on data received over a network or data received from local media. The smart home application 742 runs on mobile devices platforms, such as iPhone, iPod touch, Blackberry, Google Android, Windows Mobile, etc. The smart home application 742 enables the user device 740 to receive and process image and sensor data from the monitoring system.

The user device 750 may be a general-purpose computer (e.g., a desktop personal computer, a workstation, or a laptop computer) that is configured to communicate with the monitoring server 760 and/or the control unit 710 over the network 705. The user device 750 may be configured to display a smart home user interface 752 that is generated by the user device 750 or generated by the monitoring server 760. For example, the user device 750 may be configured to display a user interface (e.g., a web page) provided by the monitoring server 760 that enables a user to perceive images captured by the thermal camera 730 and/or reports related to the monitoring system. Although FIG. 7 illustrates two user devices for brevity, actual implementations may include more (and, perhaps, many more) or fewer user devices.

The smart home application 742 and the smart home user interface 752 can allow a user to interface with the property monitoring system 700, for example, allowing the user to view monitoring system settings, adjust monitoring system parameters, customize monitoring system rules, and receive and view monitoring system messages.

In some implementations, the one or more user devices 740 and 750 communicate with and receive monitoring system data from the control unit 710 using the communication link 738. For instance, the one or more user devices 740 and 750 may communicate with the control unit 710 using various local wireless protocols such as Wi-Fi, Bluetooth, Z-wave, Zigbee, HomePlug (Ethernet over power line), or wired protocols such as Ethernet and USB, to connect the one or more user devices 740 and 750 to local security and automation equipment. The one or more user devices 740 and 750 may connect locally to the monitoring system and its sensors and other devices. The local connection may improve the speed of status and control communications because communicating through the network 705 with a remote server (e.g., the monitoring server 760) may be significantly slower.

Although the one or more user devices 740 and 750 are shown as communicating with the control unit 710, the one or more user devices 740 and 750 may communicate directly with the sensors 720 and other devices controlled by the control unit 710. In some implementations, the one or more user devices 740 and 750 replace the control unit 710 and perform the functions of the control unit 710 for local monitoring and long range/offsite communication.

In other implementations, the one or more user devices 740 and 750 receive monitoring system data captured by the control unit 710 through the network 705. The one or more user devices 740, 750 may receive the data from the control unit 710 through the network 705 or the monitoring server 760 may relay data received from the control unit 710 to the one or more user devices 740 and 750 through the network 705. In this regard, the monitoring server 760 may facilitate communication between the one or more user devices 740 and 750 and the monitoring system 700.

In some implementations, the one or more user devices 740 and 750 may be configured to switch whether the one or more user devices 740 and 750 communicate with the control unit 710 directly (e.g., through link 738) or through the monitoring server 760 (e.g., through network 705) based on a location of the one or more user devices 740 and 75021. For instance, when the one or more user devices 740 and 750 are located close to the control unit 710 and in range to communicate directly with the control unit 710, the one or more user devices 740 and 750 use direct communication. When the one or more user devices 740 and 750 are located far from the control unit 710 and not in range to communicate directly with the control unit 710, the one or more user devices 740 and 750 use communication through the monitoring server 760.

Although the one or more user devices 740 and 750 are shown as being connected to the network 705, in some implementations, the one or more user devices 740 and 750 are not connected to the network 705. In these implementations, the one or more user devices 740 and 750 communicate directly with one or more of the monitoring system components and no network (e.g., Internet) connection or reliance on remote servers is needed.

In some implementations, the one or more user devices 740 and 750 are used in conjunction with only local sensors and/or local devices in a house. In these implementations, the system 700 includes the one or more user devices 740 and 750, the sensors 720, the property automation controls 722, the thermal camera 730, and the robotic devices 790. The one or more user devices 740 and 750 receive data directly from the sensors 720, the property automation controls 722, the thermal camera 730, and the robotic devices 790 (i.e., the monitoring system components) and sends data directly to the monitoring system components. The one or more user devices 740, 750 provide the appropriate interfaces/processing to provide visual surveillance and reporting.

In other implementations, the system 700 further includes network 705 and the sensors 720, the property automation controls 722, the thermal camera 730, the thermostat 734, and the robotic devices 79 are configured to communicate sensor and image data to the one or more user devices 740 and 750 over network 705 (e.g., the Internet, cellular network, etc.). In yet another implementation, the sensors 720, the property automation controls 722, the thermal camera 730, the thermostat 734, and the robotic devices 790 (or a component, such as a bridge/router) are intelligent enough to change the communication pathway from a direct local pathway when the one or more user devices 740 and 750 are in close physical proximity to the sensors 720, the property automation controls 722, the thermal camera 730, the thermostat 734, and the robotic devices 790 to a pathway over network 705 when the one or more user devices 740 and 750 are farther from the sensors 720, the property automation controls 722, the thermal camera 730, the thermostat 734, and the robotic devices 790. In some examples, the system leverages GPS information from the one or more user devices 740 and 750 to determine whether the one or more user devices 740 and 750 are close enough to the monitoring system components to use the direct local pathway or whether the one or more user devices 740 and 750 are far enough from the monitoring system components that the pathway over network 705 is required. In other examples, the system leverages status communications (e.g., pinging) between the one or more user devices 740 and 750 and the sensors 720, the property automation controls 722, the thermal camera 730, the thermostat 734, and the robotic devices 790 to determine whether communication using the direct local pathway is possible. If communication using the direct local pathway is possible, the one or more user devices 740 and 750 communicate with the sensors 720, the property automation controls 722, the thermal camera 730, the thermostat 734, and the robotic devices 790 using the direct local pathway. If communication using the direct local pathway is not possible, the one or more user devices 740 and 750 communicate with the monitoring system components using the pathway over network 705.

In some implementations, the system 700 provides end users with access to thermal images captured by the thermal camera 730 to aid in decision making. The system 700 may transmit the thermal images captured by the thermal camera 730 over a wireless WAN network to the user devices 740 and 750. Because transmission over a wireless WAN network may be relatively expensive, the system 700 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the thermal camera 730 or other cameras of the system 700). In these implementations, the thermal camera 730 may be set to capture thermal images on a periodic basis when the alarm system is armed in an "armed away" state, but set not to capture images when the alarm system is armed in an "armed stay" or "unarmed" state. In addition, the thermal camera 730 may be triggered to begin capturing thermal images when the alarm system detects an event, such as an alarm event, a door-opening event for a door that leads to an area within a field of view of the thermal camera 730, or motion in the area within the field of view of the thermal camera 730. In other implementations, the thermal camera 730 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random-access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure. A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method comprising:
maintaining, by a security system that includes one or more computers, a sequence of images captured by a camera at a property;
detecting first features depicted in a first image of the sequence of images;
determining that a difference between the first features and second features depicted in a second, different image of the sequence of images satisfies a similarity threshold;
in response to determining that the difference between the first features and the second features depicted in the second, different image of the sequence of images satisfies the similarity threshold, determining, by the security system, whether there is a discontinuity in the sequence of images captured by the camera at the property that indicates a potential spoofing attack; and
in response to determining whether there is the discontinuity, performing, by the security system, one or more actions using a result of the determination whether there is the discontinuity in the sequence of images and that indicates a potential spoofing attack.

2. The method of claim 1, wherein determining that the difference between the first features and the second features satisfies the similarity threshold comprises:
determining, from the second image of the sequence of images, that the first features are not detected in the second image.

3. The method of claim 1, wherein determining whether there is the discontinuity comprises:
comparing the first features to the second features to determine a degree of similarity between the first features and the second features; and
detecting the discontinuity using the degree of similarity satisfying the similarity threshold.

4. The method of claim 3, wherein detecting the discontinuity using the degree of similarity comprises:
detecting the discontinuity in response to determining that the degree of similarity satisfies the similarity threshold.

5. The method of claim 3, wherein comparing the first features to the second features to determine the degree of similarity between the first features and the second features comprises:
comparing a first feature vector that represents the first features with a second feature vector that represents the second features.

6. The method of claim 1, comprising determining that there is the discontinuity in the sequence of images captured by the camera at the property and determining that the discontinuity indicates a potential spoofing attack, wherein determining that the discontinuity indicates the potential spoofing attack comprises:
determining a physical discontinuity location at which the discontinuity likely occurred at the property;
determining, using data from a database, that the database does not include an entry for a known occlusion caused by a physical object at the physical discontinuity location; and
determining that the discontinuity does not correspond to a known occlusion and that the discontinuity indicates the potential spoofing attack using the determination that the database does not include an entry for a known occlusion.

7. The method of claim 6, wherein determining that the database does not include an entry for a known occlusion caused by a physical object at the physical discontinuity location comprises:
comparing a location for one or more known occlusions stored in the database to the physical discontinuity location.

8. The method of claim 1, comprising:
determining that there is the discontinuity in the sequence of images captured by the camera at the property;
determining that the discontinuity indicates a potential spoofing attack; and
after determining that the discontinuity indicates the potential spoofing attack, sending a signal configured to obtain data from one or more sensors.

9. The method of claim 8, wherein performing the one or more actions comprises providing at least some of the data from the one or more sensors to a device of a user.

10. The method of claim 1, wherein performing the one or more actions comprises:
processing data from sensors at the property; and
determining, from a plurality of indication techniques, a technique for providing an indication of whether there is the discontinuity based on processing the data from the sensors at the property.

11. The method of claim 1, comprising:
receiving a request from a device of a user in response to performing the one or more actions using the result of the determination whether there is the discontinuity.

12. The method of claim 11, wherein the request is configured to trigger obtaining data from one or more sensors.

13. The method of claim 11, wherein the request is configured to trigger obtaining data from one or more sensors that include a sensor affixed to a drone.

14. The method of claim 1, wherein performing the one or more actions comprises:
triggering an automatic door unlocking device to cause the automatic door unlocking device to run a protocol for unlocking or locking a door of the property.

15. The method of claim 1, wherein performing the one or more actions comprises:
changing a security state of an alarm system of the property.

16. The method of claim 1, comprising:
determining that there is the discontinuity in the sequence of images captured by the camera at the property;
determining that the discontinuity does not indicate a potential spoofing attack; and
in response to determining that the discontinuity does not indicate the potential spoofing attack, performing, by the security system, the one or more actions.

17. The method of claim 16, wherein performing the one or more actions comprises:
triggering an automatic door unlocking device configured to run a protocol for unlocking a door of the property.

18. The method of claim 1, wherein detecting the first features depicted in the first image of the sequence of images comprises:
detecting visual elements in the first image; and
determining the first features as features that represent the detected visual elements in the first image.

19. A system comprising one or more computers and one or more storage devices on which are stored instructions that are operable, when executed by the one or more computers, to cause the one or more computers to perform operations comprising:
obtaining, by a security system that includes one or more computers, a sequence of images captured by a camera at a property;
detecting, by the security system, a discontinuity in the images captured by the camera at the property, the detecting comprising:
detecting first features depicted in a first image of the images; and
determining that a difference between the first features and second features depicted in a second, different image of the images satisfies a similarity threshold;
in response to determining that the difference satisfies the similarity threshold, determining, by the security system, whether the discontinuity indicates a potential spoofing attack; and
in response to determining whether the discontinuity indicates the potential spoofing attack, performing, by the security system, one or more actions for the potential spoofing attack.

20. One or more non-transitory computer storage media encoded with instructions that, when executed by one or more computers, cause the one or more computers to perform operations comprising:

obtaining, by a security system that includes one or more computers, a sequence of images captured by a camera at a property;

detecting, by the security system, a discontinuity in the sequence of images captured by the camera at the property, the detecting comprising:
- detecting first features depicted in a first image of the sequence of images; and
- determining that a difference between the first features and second features depicted in a second, different image of the sequence of images satisfies a similarity threshold;

in response to determining that the difference satisfies the similarity threshold, determining, by the security system, whether the discontinuity indicates a potential spoofing attack; and in response to determining whether the discontinuity indicates the potential spoofing attack, performing, by the security system, one or more actions for the potential spoofing attack.

* * * * *